United States Patent
Hu et al.

(10) Patent No.: US 10,578,803 B2
(45) Date of Patent: Mar. 3, 2020

(54) OPTICAL (DE)MULTIPLEXERS

(71) Applicant: University of Southampton, Hampshire (GB)

(72) Inventors: Youfang Hu, Hampshire (GB); Graham Reed, Hampshire (GB); David Thomson, Hampshire (GB)

(73) Assignee: University of Southampton, Southampton, Hampshire (GB)

( * ) Notice: Subject to any disclaimer, the term of this patent is extended or adjusted under 35 U.S.C. 154(b) by 14 days.

(21) Appl. No.: 15/512,674

(22) PCT Filed: Sep. 21, 2015

(86) PCT No.: PCT/EP2015/071568
§ 371 (c)(1),
(2) Date: Sep. 26, 2017

(87) PCT Pub. No.: WO2016/042167
PCT Pub. Date: Mar. 24, 2016

(65) Prior Publication Data
US 2017/0248760 A1    Aug. 31, 2017

(30) Foreign Application Priority Data

Sep. 19, 2014   (GB) .................................. 1416601.1

(51) Int. Cl.
*G02B 6/293*  (2006.01)
*G02B 6/126*  (2006.01)
(Continued)

(52) U.S. Cl.
CPC ......... *G02B 6/29344* (2013.01); *G02B 6/126* (2013.01); *G02B 6/12007* (2013.01);
(Continued)

(58) Field of Classification Search
CPC ...... G02B 6/12007; G02B 6/126; G02B 6/26; G02B 6/2813; G02B 6/2938;
(Continued)

(56) References Cited

U.S. PATENT DOCUMENTS 6,321,001 B1   11/2001   Heflinger
6,512,864 B1   1/2003    Lin et al.
(Continued)

FOREIGN PATENT DOCUMENTS

EP   0 881 512 A2   12/1998
EP   1 445 631 A1   8/2004
(Continued)

OTHER PUBLICATIONS

Hu et al., "Interleaved Angled MMI CWDM Structure on the SOI Platform", IEEE 10th International Conference on Group IV Photonics, Aug. 2013, pp. 21 and 22.
(Continued)

*Primary Examiner* — Michael P Mooney
(74) *Attorney, Agent, or Firm* — Renner, Otto, Boisselle & Sklar, LLP

(57) ABSTRACT

An optical demultiplexer/multiplexer, comprising: a multimode interference waveguide; at least one first coupling waveguide which meets the multimode interference waveguide at least one first location and a plurality of second coupling waveguides which meet the multimode interference waveguide at a plurality of second locations which are spaced in a direction of transmission in relation to the at least one first location, with the at least one first coupling waveguide and the second coupling waveguides together with the multimode interference waveguide providing a first angled multimode interferometer which operates to demultiplex a first optical signal having optical channels of a plurality of wavelengths or multiplex optical signals of a plurality of wavelengths into a first optical signal having optical channels of the plurality of wavelengths; at least one third coupling waveguide which meets the multimode interference waveguide at least one third location and a plurality of (Continued)

fourth coupling waveguides which meet the multimode interference waveguide at a plurality of fourth locations which are spaced in a direction of transmission in relation to the at least one third location, with the at least one third coupling waveguide and the plurality of fourth coupling waveguides together with the multimode interference waveguide providing a second angled multimode interferometer which operates to demultiplex a second optical signal having optical channels of a plurality of wavelengths or multiplex optical signals of a plurality of wavelengths into a second optical signal having optical channels of the plurality of wavelengths; whereby the demultiplexer/multiplexer provides for the demultiplexing/multiplexing of first and second optical signals having optical channels of a plurality of wavelengths. In a further embodiment the first coupling waveguide of an optical demultiplexer/multiplexer comprising a first angled multimode interferometer is stepped or tapered in order to couple a signal having a broadened spatial, or spectral, profile. In another embodiment of an optical demultiplexer/multiplexer comprising a first angled multimode interferometer a plurality of first coupling waveguides are coupled to a photonic structure which provides a plurality of output signals having substantially equal intensity and a phase difference, also in order to couple a signal or signals having a broadened spatial, or spectral, profile. In yet another embodiment of an optical demultiplexer/multiplexer comprising a first angled multimode interferometer the multimode interference waveguide includes a reflector at one end.

29 Claims, 27 Drawing Sheets

(51) Int. Cl.
*G02B 6/28* (2006.01)
*G02B 6/12* (2006.01)

(52) U.S. Cl.
CPC ......... *G02B 6/2813* (2013.01); *G02B 6/2938* (2013.01); *G02B 2006/1209* (2013.01); *G02B 2006/12061* (2013.01); *G02B 2006/12164* (2013.01)

(58) Field of Classification Search
CPC ...... G02B 6/29344; G02B 2006/12164; G02B 2006/12061; G02B 2006/1209
USPC .................................. 385/14–25, 39, 42, 46
See application file for complete search history.

(56) References Cited

U.S. PATENT DOCUMENTS

| 7,003,194 | B2 | 2/2006 | Jenkins | |
|---|---|---|---|---|
| 7,734,122 | B1 | 6/2010 | Mackie | |
| 2002/0001433 | A1 | 1/2002 | Hosoi | |
| 2004/0247235 | A1* | 12/2004 | Jenkins | .............. G02B 6/12007 385/15 |

FOREIGN PATENT DOCUMENTS

| GB | 2 135 075 A | 8/1984 |
|---|---|---|
| WO | 95/22070 | 8/1995 |
| WO | 01/33270 A1 | 5/2001 |
| WO | 2014/017154 A1 | 1/2014 |

OTHER PUBLICATIONS

Jung et al., "Wavelength division demultiplexer and integrated III-V semiconductor lasers on a silicon photonics platform with microbubble manipulation", IEEE 12$^{th}$ International Conference on Group IV Photonics, Aug. 2015, pp. 5 and 6.
International Search Report and Written Opinion for corresponding Patent Application No. PCT/EP2015/071568 dated Mar. 14, 2016.

* cited by examiner

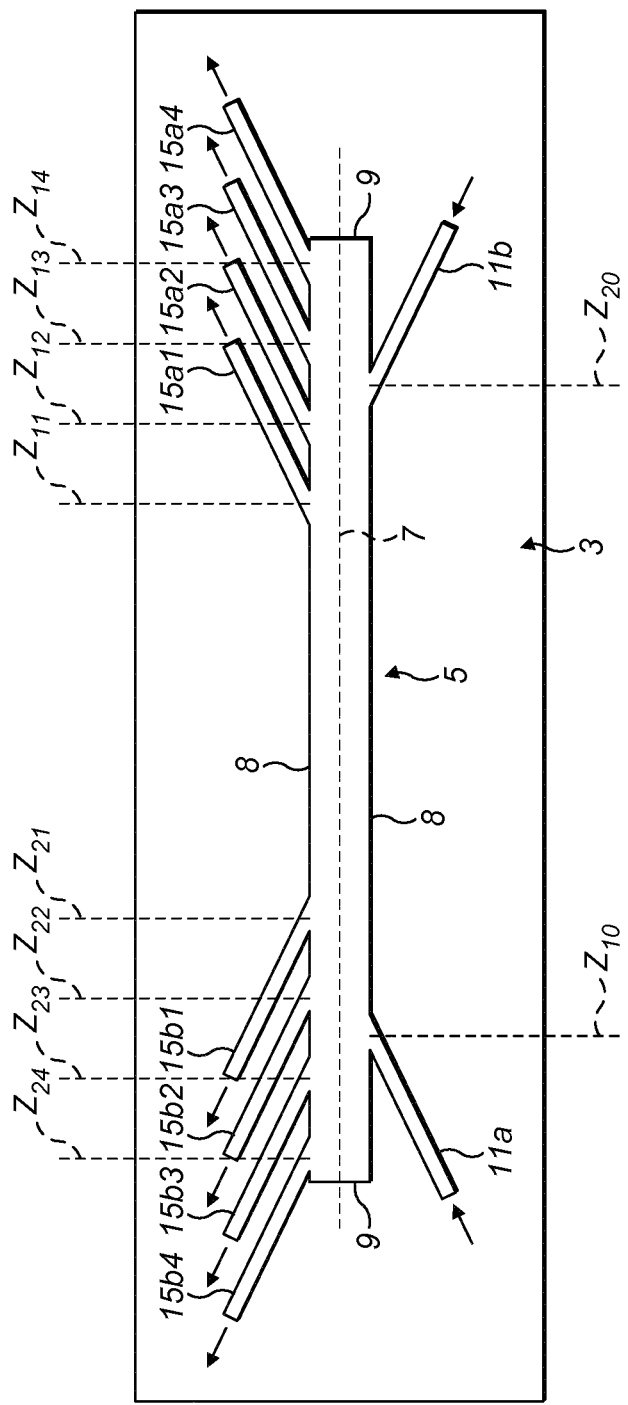

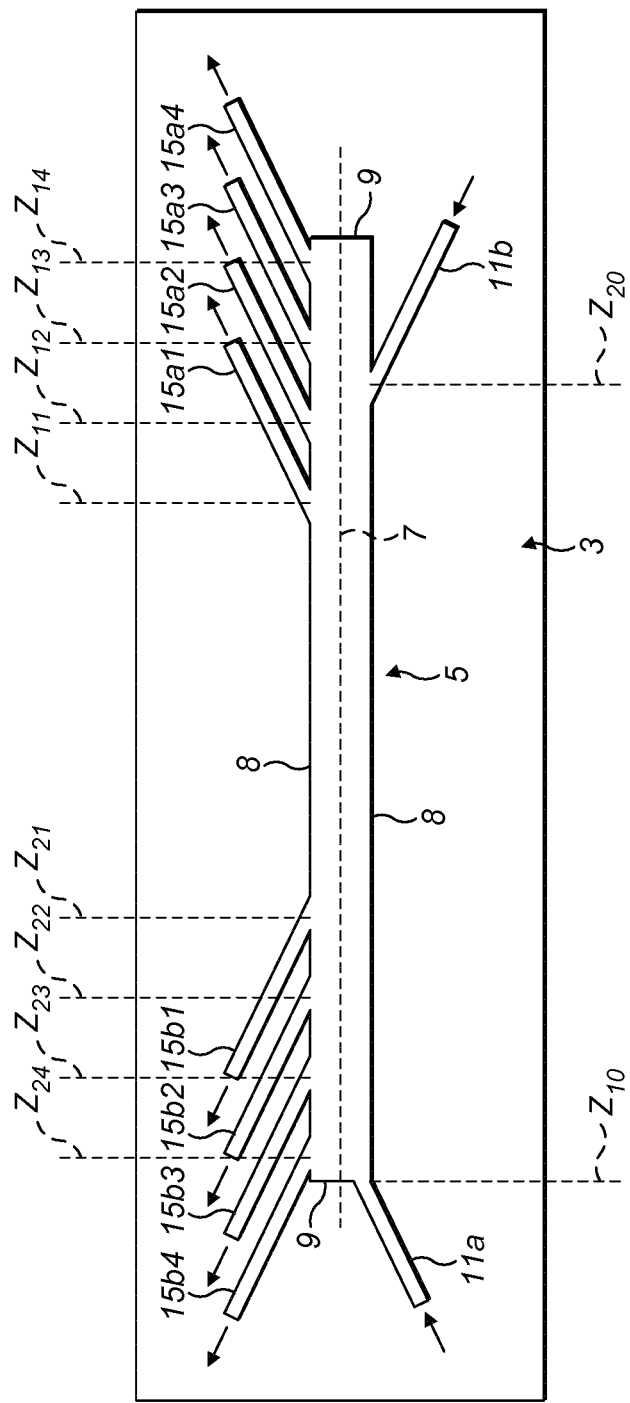

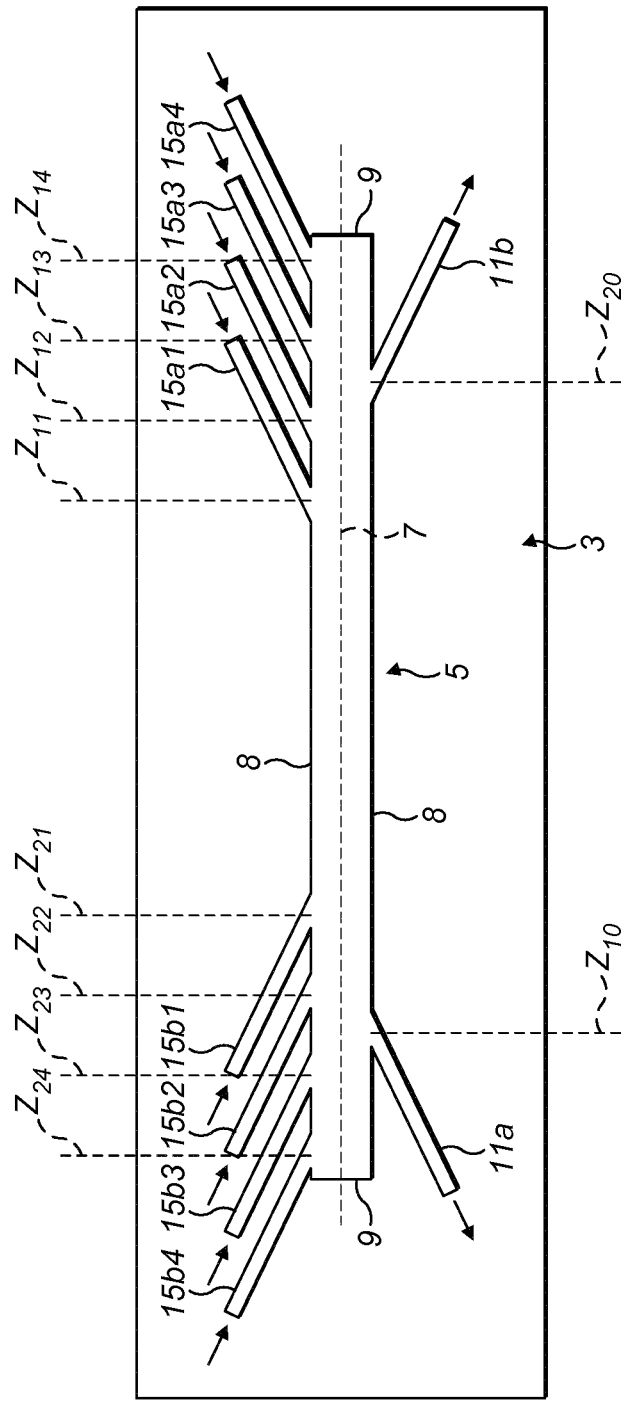

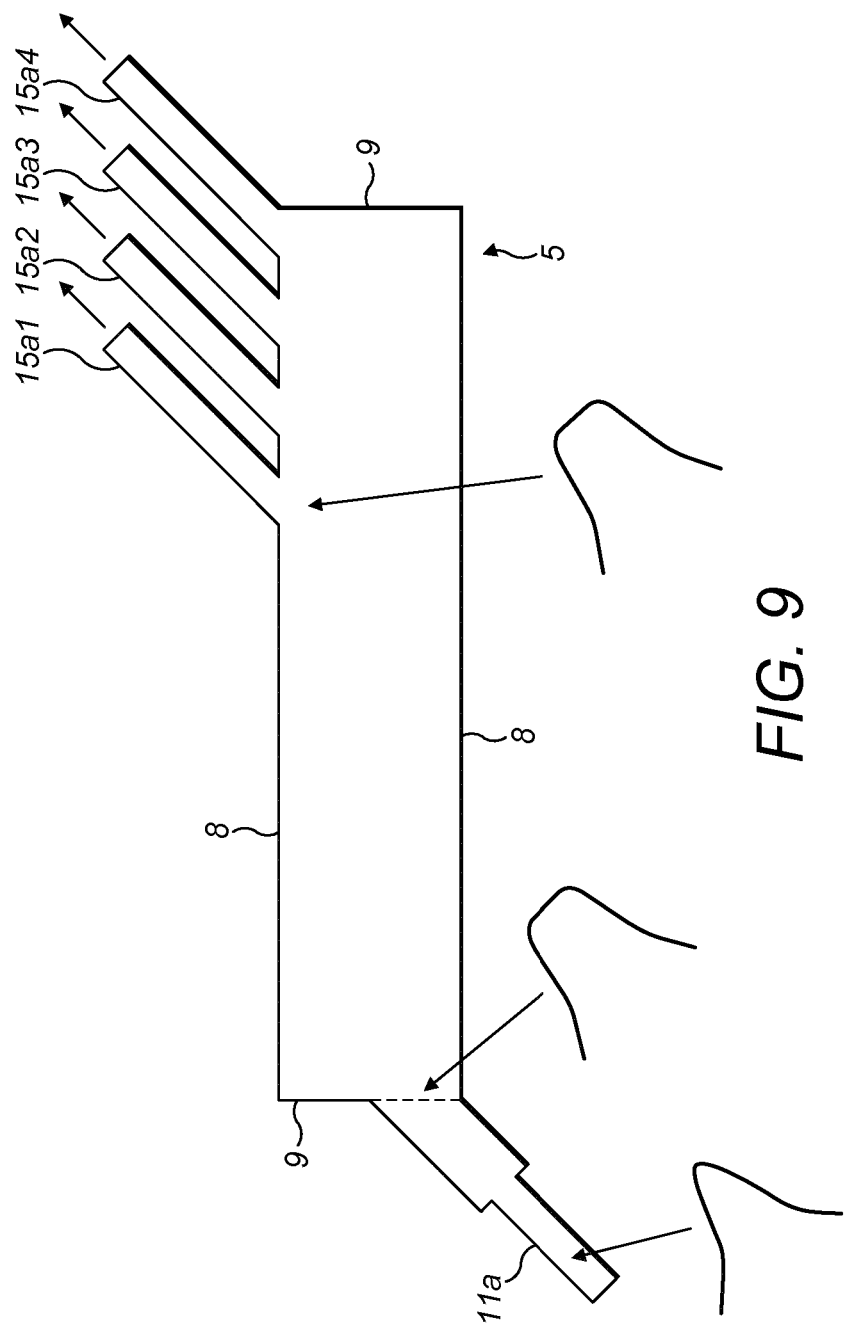

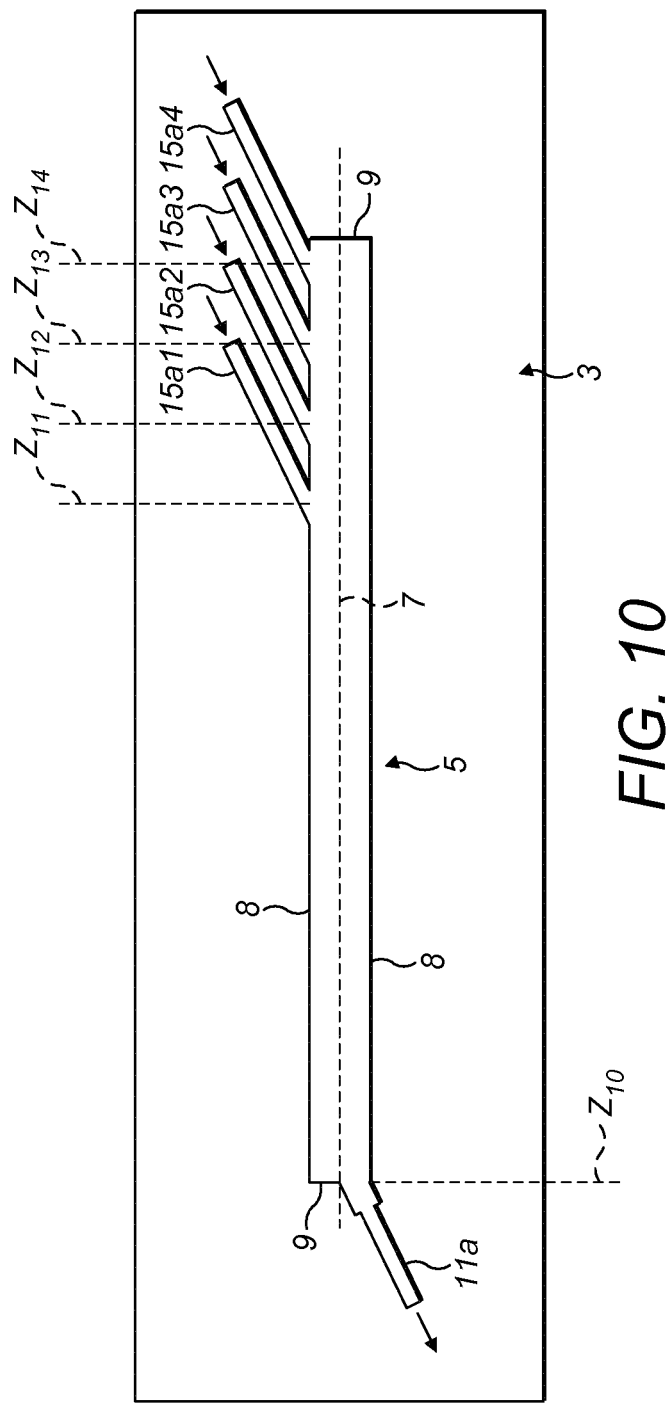

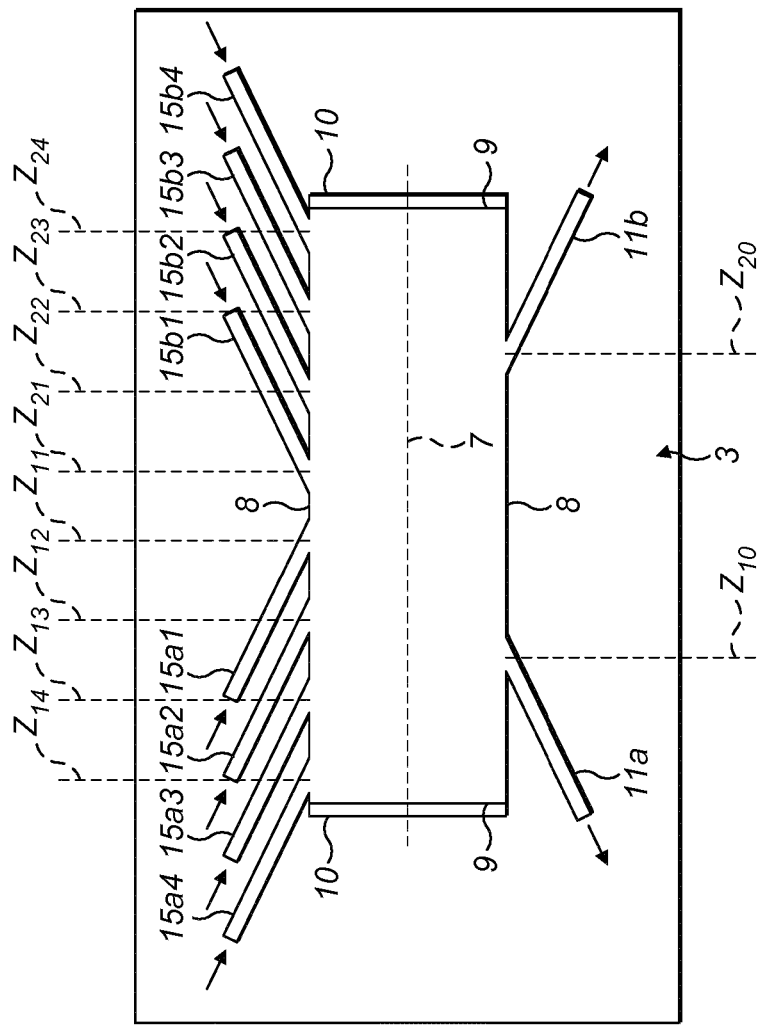

OPTICAL (DE)MULTIPLEXERS

This application is a national phase of International Application No. PCT/EP2015/071568 filed Sep. 21, 2015 and published in the English language, which claims priority to United Kingdom Patent Application No. 1416601.1 filed Sep. 19, 2014, which are hereby incorporated herein by reference.

The present invention relates to optical (de)multiplexers, in particular wavelength division (de)multiplexers (WDMs) and/or polarization (de)multiplexers (PDMs).

Optical (de)multiplexers have numerous applications, including optical sensors and transceivers.

Existing solutions include thin-film filters (TFFs), arrayed waveguide gratings (AWGs), planar concave gratings (PCGs), cascaded Mach-Zehnder interferometers (MZIs), ring resonators for re-configurable optical add-drop multiplexer (ROADMs) and angled multi-mode interferometers (AMMIs).

In a typical integrated optical transceiver, there is a multiplexer (MUX) for wavelength multiplexing in the transmitter part and a de-multiplexer (DEMUX) for wavelength de-multiplexing in the receiver part, with the multiplexer (MUX) and the de-multiplexer (DEMUX) being wavelength matched.

A further de-multiplexer (DEMUX) may be required in order to enable multi-wavelength light from an external source to be coupled to the silicon chip on a single fiber, with the different wavelengths being separated on-chip. This approach may be preferred due to difficulties brought about by forming a light source on the photonic chip. A further de-multiplexer (DEMUX) may also be required if a polarisation diversity scheme is used in the receiver part of the transceiver.

A highly-uniform wafer platform and precise engineering are required in order to achieve a good match in the transmission wavelengths. This requirement is more stringent in a high-index-contrast platform, e.g. a silicon-on-insulator (SOI) platform; hence, the spectral response of an optical (de)multiplexer (WDM) on a SOI platform is usually very sensitive to dimensional variation in fabrication. Typically, this sensitivity is at a scale of a 1 nm shift in transmission wavelength with respect to a 1 nm error in the fabricated thickness of the waveguide.

The angled multimode interferometer (AMMI) has the advantage of lower sensitivity to dimensional variation in the waveguide, and also allows for simpler fabrication, as well as low insertion loss and low cross talk. One such AMMI is disclosed is in U.S. Pat. No. 7,003,194.

Despite this reduced sensitivity, a 1 nm shift in the silicon overlayer thickness still results in a shift in the spectral response of 0.5-1 nm in a typical AMMI. It is therefore difficult to ensure that the multiplexer (MUX) and demultiplexer (DEMUX) structures on the same chip are well aligned, and in practice a tuning mechanism may be required to tune each structure individually, in order to compensate for variance in fabrication and ambient temperature.

The present inventors have recognized that surprisingly, and contrary to the understanding of the skilled person, a multimode interference (MMI) waveguide of the kind as employed in the AMMI of U.S. Pat. No. 7,003,194 can be configured to have regions or windows at sidewalls of the MMI waveguide which allow access to the waveguide without causing significant perturbation of the light propagation in the waveguide, being in one embodiment regions or windows of zero intensity, and so enable the implementation of a plurality of AMMIs using a single, common multimode interference (MMI) waveguide, with low insertion loss and cross-talk. FIG. 1 represents access regions or windows in an AMMI having a signal propagating between an input waveguide and a channel of an output waveguide, here, for purposes of illustration, operating as a demultiplexer.

With this configuration, the MMI waveguide is shared, for example, being accessed from opposite ends of the MMI waveguide, effectively implementing a plurality of (de)multiplexers in the same MMI waveguide.

Consequently, this configuration has the particular advantage that the shared MMI waveguide has exactly the same dimensions and the same thermal behaviour for each of the implemented (de)multiplexers, meaning that their spectral responses will be identical, with matching of the peak transmission wavelengths.

In addition, only a single tuning element and control circuit is required, as the spectral responses of each of the AMMIs will be commonly shifted identically. In requiring only a single tuning element and control circuit, power consumption, complexity and also the device footprint are significantly reduced.

In one aspect the present invention provides an optical demultiplexer/multiplexer, comprising: a multimode interference waveguide; at least one first coupling waveguide which meets the multimode interference waveguide at at least one first location and a plurality of second coupling waveguides which meet the multimode interference waveguide at a plurality of second locations which are spaced in a direction of transmission in relation to the at least one first location, with the at least one first coupling waveguide and the second coupling waveguides together with the multimode interference waveguide providing a first angled multimode interferometer which operates to demultiplex a first optical signal having optical channels of a plurality of wavelengths or multiplex optical signals of a plurality of wavelengths into a first optical signal having optical channels of the plurality of wavelengths; at least one third coupling waveguide which meets the multimode interference waveguide at at least one third location and a plurality of fourth coupling waveguides which meet the multimode interference waveguide at a plurality of fourth locations which are spaced in a direction of transmission in relation to the at least one third location, with the at least one third coupling waveguide and the plurality of fourth coupling waveguides together with the multimode interference waveguide providing a second angled multimode interferometer which operates to demultiplex a second optical signal having optical channels of a plurality of wavelengths or multiplex optical signals of a plurality of wavelengths into a second optical signal having optical channels of the plurality of wavelengths; whereby the demultiplexer/multiplexer provides for the demultiplexing/multiplexing of first and second optical signals having optical channels of a plurality of wavelengths.

In one aspect the present invention provides an optical demultiplexer/multiplexer, comprising: a multimode interference waveguide, wherein the multimode interference waveguide includes a first reflector at one end in a first direction of transmission which acts to reflect an optical signal or signals in a second direction of transmission which is opposite to the first direction of transmission; at least one first coupling waveguide which meets the multimode interference waveguide at at least one first location and a plurality of second coupling waveguides which meet the multimode interference waveguide at a plurality of second locations, with the at least one first coupling waveguide and the plurality of second coupling waveguides together with the multimode interference waveguide providing a first angled multimode interferometer which operates to demultiplex a first optical signal having optical channels of a plurality of wavelengths and/or polarizations or multiplex optical signals of a plurality of wavelengths and/or polarizations into a first optical signal having optical channels of the plurality of wavelengths and/or polarizations; and at least one third coupling waveguide which meets the multimode interference waveguide at at least one third location and a plurality of fourth coupling waveguides which meet the multimode interference waveguide at a plurality of fourth locations, with the at least one third coupling waveguide and the plurality of fourth coupling waveguides together with the multimode interference waveguide providing a second angled multimode interferometer which operates to demultiplex a second optical signal having optical channels of a plurality of wavelengths and/or polarizations or multiplex optical signals of a plurality of wavelengths and/or polarizations into a second optical signal having optical channels of the plurality of wavelengths and/or polarizations.

The present inventors have also further recognized that existing AMMIs can be improved significantly, in particular to provide improved characteristics and/or be of reduced size.

In one aspect the present invention provides an optical demultiplexer/multiplexer, comprising: a multimode interference waveguide; at least one first coupling waveguide which meets the multimode interference waveguide at at least one first location and a plurality of second coupling waveguides which meet the multimode interference waveguide at a plurality of second locations which are spaced in a direction of transmission in relation to the at least one first location, with the at least one first coupling waveguide and the plurality of second coupling waveguides together with the multimode interference waveguide providing an angled multimode interferometer which operates to demultiplex a first optical signal having optical channels of a plurality of wavelengths and/or polarizations or multiplex optical signals of a plurality of wavelengths and/or polarizations into a first optical signal having optical channels of the plurality of wavelengths and/or polarizations; wherein the at least one first coupling waveguide is configured to couple a signal between the at least one first coupling waveguide and the multimode interference waveguide which has a broadened spatial profile, optionally having a substantially flat-top spectral profile.

In one aspect the present invention provides an optical demultiplexer/multiplexer, comprising: a multimode interference waveguide; a plurality of first coupling waveguides which meet the multimode interference waveguide at a plurality of first locations and a plurality of second coupling waveguides which meet the multimode interference waveguide at a plurality of second locations which are spaced in a direction of transmission in relation to the first locations, with the first and second coupling waveguides together with the multimode interference waveguide providing an angled multimode interferometer which operates to demultiplex an optical signal having optical channels of a plurality of wavelengths and/or polarizations or multiplex optical signals of a plurality of wavelengths and/or wavelengths into an optical signal having optical channels of the plurality of wavelengths and/or polarizations; wherein the first coupling waveguides are configured to receive optical signals having different wavelength and/or polarization components, each comprising optical channels having a plurality of wavelengths and/or polarizations, and provide for a broadened spatial profile, optionally having a substantially flat-top spectral profile, to signals transmitted between the first and second coupling waveguides.

In one aspect the present invention provides an optical demultiplexer/multiplexer, comprising: a multimode interference waveguide, wherein the multimode interference waveguide includes a first reflector at one end in a first direction of transmission which acts to reflect an optical signal or signals in a second direction of transmission which is opposite to the first direction of transmission; and at least one first coupling waveguide which meets the multimode interference waveguide at at least one first location and a plurality of second coupling waveguides which meet the multimode interference waveguide at a plurality of second locations, with the at least one first coupling waveguide and the plurality of second coupling waveguides together with the multimode interference waveguide providing a first angled multimode interferometer which operates to demultiplex a first optical signal having optical channels of a plurality of wavelengths and/or polarizations or multiplex optical signals of a plurality of wavelengths and/or polarizations into a first optical signal having optical channels of the plurality of wavelengths and/or polarizations.

The present invention also extends to an optical transceiver incorporating the at least one demultiplexer/multiplexer as above described.

The present invention further extends to an optical sensor incorporating the at least one demultiplexer/multiplexer as above described.

In one embodiment the present invention provides a method of using the demultiplexer/multiplexer as above described, in which the first and second angled multimode interferometers each operate as demultiplexers.

In another embodiment the present invention provides a method of using the demultiplexer/multiplexer as above described, in which the first and second angled multimode interferometers each operate as multiplexers.

In a further embodiment the present invention provides a method of using the demultiplexer/multiplexer as above described, in which one of the first and second angled multimode interferometers operates as a demultiplexer and the other of the first and second angled multimode interferometers operates as a multiplexer.

Preferred embodiments of the present invention will now be described hereinbelow by way of example only with reference to the accompanying drawings, in which:

FIG. 2 illustrates a plan view of an optical (de)multiplexer in accordance with a first embodiment of the present invention, with the first and second AMMIs each operating as a demultiplexer (DEMUX);

FIG. 2(a) illustrates a plan view of an optical (de)multiplexer as a modification of the (de)multiplexer of FIG. 2;

FIG. 3 illustrates a plan view of the optical (de)multiplexer of FIG. 2, with the first and second AMMIs each operating as a multiplexer (MUX);

FIG. 9 represents the spatial profiles of the input and output channels of the MMI waveguide of FIG. 8, having a broadened spatial profile;

FIG. 10 illustrates a plan view of the optical (de)multiplexer (WDM) of FIG. 8, with the AMMI operating as a multiplexer (MUX);

FIG. 17 illustrates a plan view of the optical (de)multiplexer (WDM) of FIG. 16, with each of the first and second AMMIs operating as a multiplexer (MUX)

FIG. 2 illustrates an optical (de)multiplexer (WDM) 3 in accordance with a first embodiment of the present invention.

Figure 1:
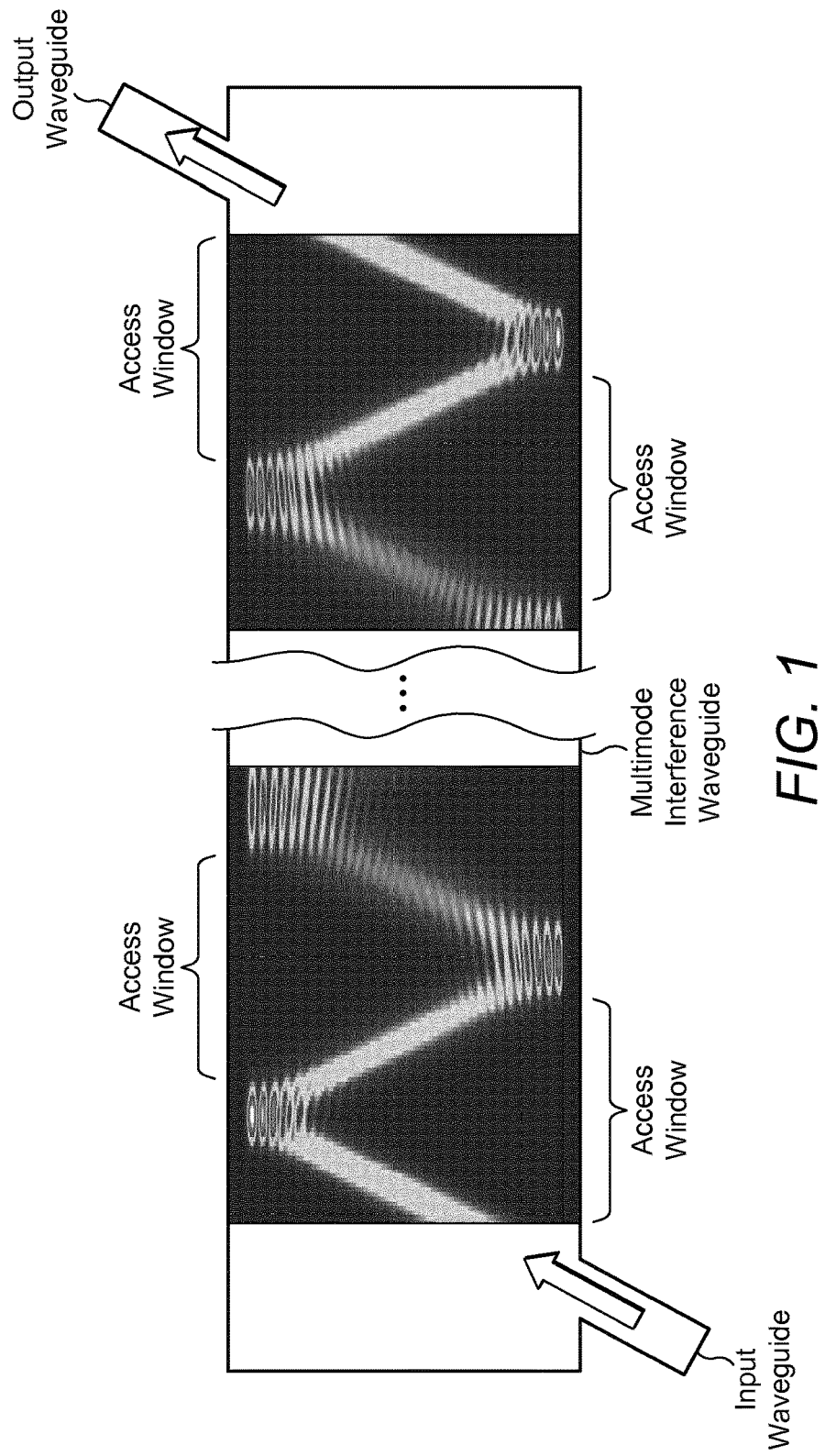
FIG. 1 represents access regions or windows in an AMMI having a signal propagating between an input waveguide and a channel of an output waveguide, here, for purposes of illustration, operating as a demultiplexer.

In this embodiment the WDM 3 is a semiconductor structure, here implemented in silicon.

The WDM 3 comprises a multimode interference (MMI) waveguide 5 having a central, longitudinal axis 7, which operates to demultiplex an optical signal having optical channels of a plurality of wavelengths $\lambda_{1-4}$ or multiplex optical signals of a plurality of wavelengths $\lambda_{1-4}$ into an optical signal having optical channels of the plurality of wavelengths $\lambda_{1-4}$.

In this embodiment the MMI waveguide 5 comprises a planar, elongate rectangular structure having longitudinal sidewalls 8 and lateral endwalls 9.

The WDM 3 comprises a first coupling waveguide 11a which meets the MMI waveguide 5 at a first location $Z_{10}$ and a plurality of second coupling waveguides 15a1-a4 which meet the MMI waveguide 5 at a plurality of second spaced locations $Z_{11}$, $Z_{12}$, $Z_{13}$, $Z_{14}$ in a direction of transmission, with the first coupling waveguide 11a and the plurality of second coupling waveguides 15a1-a4 together providing a first angled multimode interferometer (AMMI) which can operate as a demultiplexer, with the first coupling waveguide 11a being an input waveguide and the second coupling waveguides 15a1-a4 being output waveguides, or a multiplexer, with the first coupling waveguide 11a being an output waveguide and the second coupling waveguides 15a1-a4 being input waveguides.

In this embodiment the first coupling waveguide 11a is coupled to a sidewall 8 of the MMI waveguide 5.

In one alternative embodiment, as illustrated in FIG. 2(a), the first coupling waveguide 11a could be coupled to an endwall 9 of the MMI waveguide 5.

Figure 2B:
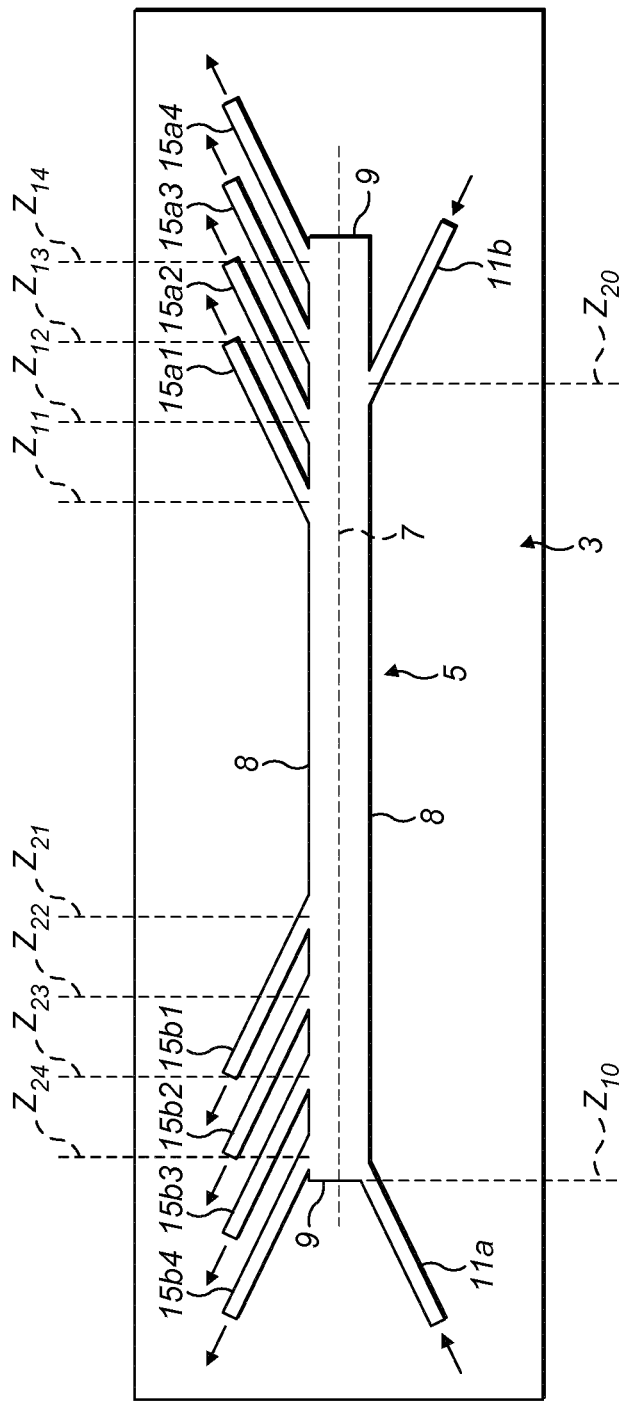
FIG. 2(b) illustrates a plan view of an optical (de)multiplexer as another modification of the optical (de)multiplexer of FIG. 2.

In another alternative embodiment, as illustrated in FIG. 2(b), the first coupling waveguide 11a could be coupled to a junction of a sidewall 8 and an endwall 9 of the MMI waveguide 5.

In this embodiment the second coupling waveguides 15a1-a4 are coupled to a sidewall 8 of the MMI waveguide 5.

In this embodiment the first AMMI is operating as a demultiplexer (DEMUX).

With this configuration, multiplexed input radiation, which comprises optical channels having a plurality of wavelengths $\lambda_{1-4}$, is guided by the first coupling waveguide 11a to the MMI waveguide 5 at the first location $Z_{10}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the second locations $Z_{11}$, $Z_{12}$, $Z_{13}$, $Z_{14}$, whereby the spectral components of each of the wavelengths $\lambda_{1-4}$ are coupled into respective ones of the second coupling waveguides 15a1-a4.

The first and second coupling waveguides 11a, 15a1-a4 are each inclined, at a common angle, to the longitudinal axis 7 of the MMI waveguide 5, with the angle and waveguide dimensions being configured to provide high-fidelity mirrored images of the signal at the first coupling waveguide 11a at the second coupling waveguides 15a1-a4 with respect to the wavelengths $\lambda_{1-4}$. The inclination angle is chosen to avoid perturbation effects within the MMI waveguide 5.

In this embodiment the first coupling waveguide 11a and the second coupling waveguides 15a1-a4 are coupled to opposite sides of the MMI waveguide 5, but in an alternative embodiment the first coupling waveguide 11a and the second coupling waveguides 15a1-a4 could be coupled to the same sidewall 8 of the MMI waveguide 5.

The WDM 3 further comprises a third coupling waveguide 11b which meets the MMI waveguide 5 at a third location $Z_{20}$ and a plurality of fourth coupling waveguides 15b1-b4 which meet the MMI waveguide 5 at a plurality of spaced fourth locations $Z_{21}$, $Z_{22}$, $Z_{23}$, $Z_{24}$ in a direction of transmission, with the third coupling waveguide 11b and the fourth coupling waveguides 15b1-b4 together providing a second angled multimode interferometer (AMMI) which can operate as a demultiplexer, with the third coupling waveguide 11b being an input waveguide and the fourth coupling waveguides 15b1-b4 being output waveguides, or a multiplexer, with the third coupling waveguide 11b being an output waveguide and the fourth coupling waveguides 15b1-b4 being input waveguides.

As discussed above, the locations $Z_{20}$, $Z_{21}$, $Z_{22}$, $Z_{23}$, $Z_{24}$ of the third and fourth coupling waveguides 11b, 15b1-b4 are at regions or windows where the perturbation to the interference pattern of the first AMMI is negligible, in one embodiment regions or windows or zero intensity.

In this embodiment the third coupling waveguide 11b is coupled to a sidewall 8 of the MMI waveguide 5.

Figure 2C:
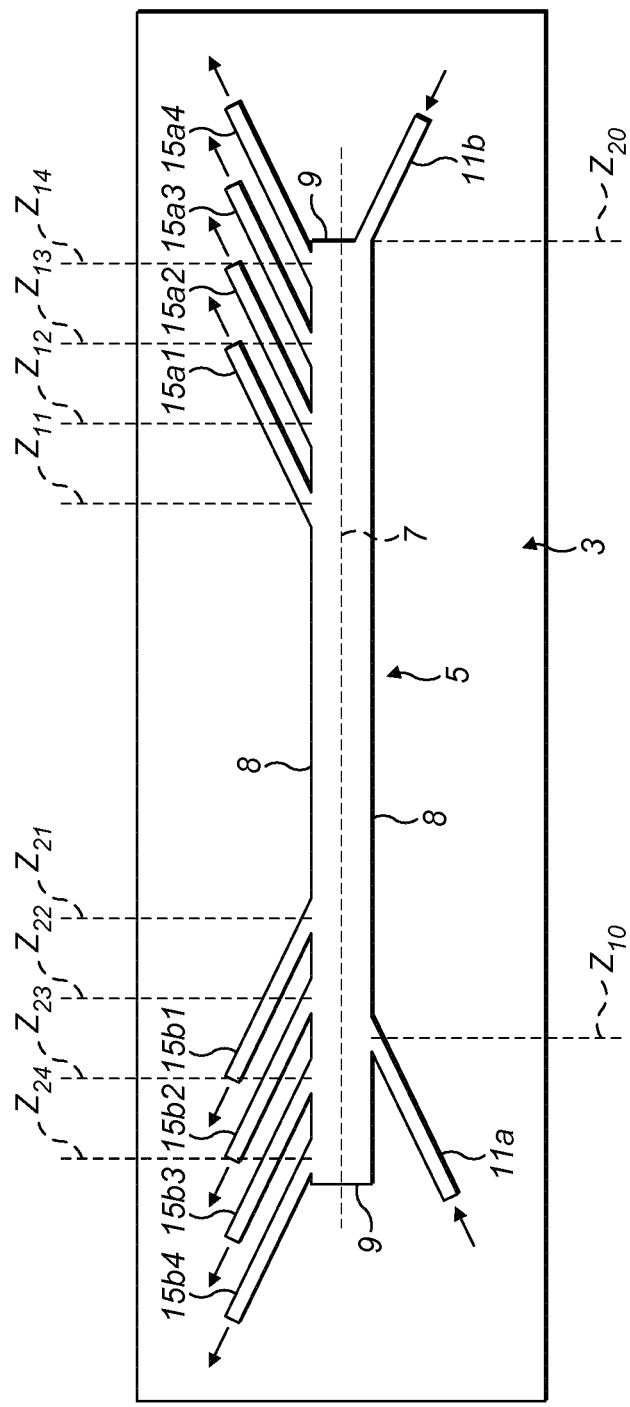
FIG. 2(c) illustrates a plan view of an optical (de)multiplexer as a further modification of the optical (de)multiplexer of FIG. 2.

In one alternative embodiment, as illustrated in FIG. 2(c), the third coupling waveguide 11c could be coupled to an endwall 9 of the MMI waveguide 5.

Figure 2D:
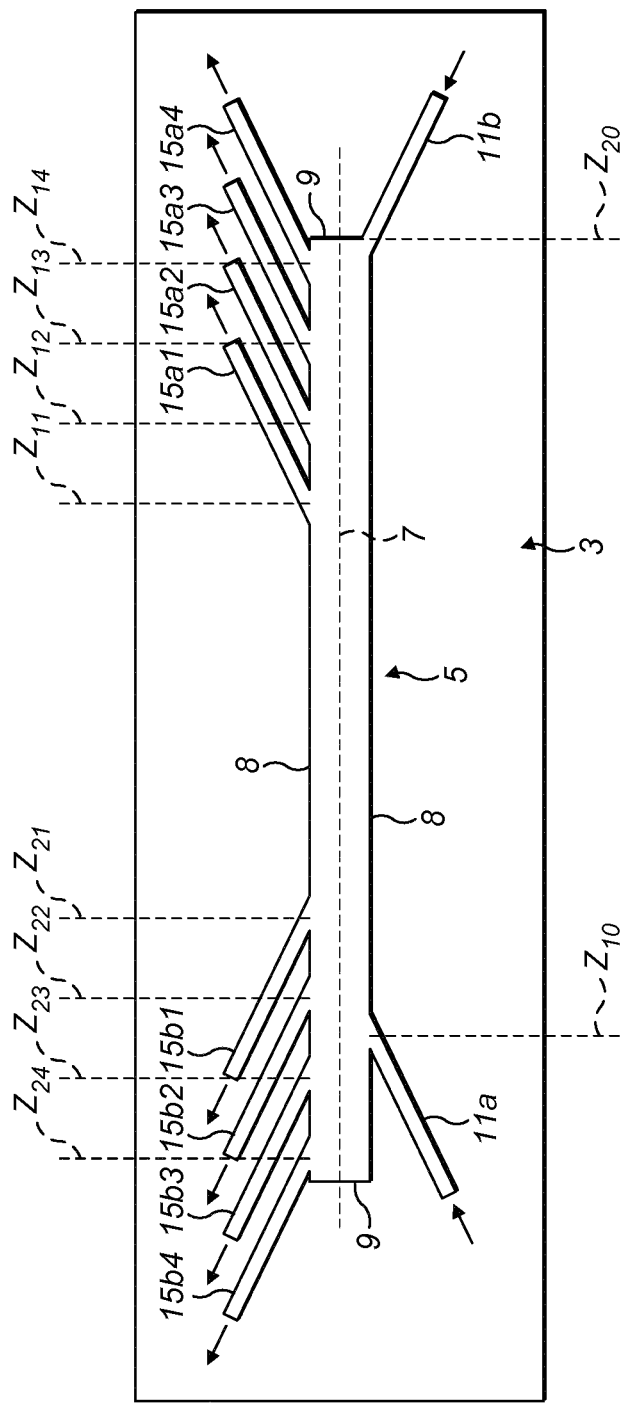
FIG. 2(d) illustrates a plan view of an optical (de)multiplexer as a still further modification of the optical (de)multiplexer of FIG. 2.

In another alternative embodiment, as illustrated in FIG. 2(d), the third coupling waveguide 11c could be coupled to a junction of a sidewall 8 and an endwall 9 of the MMI waveguide 5.

In this embodiment the fourth coupling waveguides 15b1-b4 are coupled to a sidewall 8 of the MMI waveguide 5.

In this embodiment the second AMMI is operating as a demultiplexer (DEMUX).

With this configuration, multiplexed input radiation, which comprises optical channels having a plurality of wavelengths $\lambda_{1-4}$, is guided by the third coupling waveguide 11b to the MMI waveguide 5 at the third location $Z_{20}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the fourth locations $Z_{21}$, $Z_{22}$, $Z_{23}$, $Z_{24}$, whereby the spectral components of each of the wavelengths $\lambda_{1-4}$ are coupled into respective ones of the fourth coupling waveguides 15b1-b4.

The third and fourth coupling waveguides 11b, 15b1-b4 are each inclined, at a common input angle, to the longitudinal axis 7 of the MMI waveguide 5, with the angle and waveguide dimensions being configured to provide high-fidelity mirrored images of the signal at the third coupling waveguide 11b at the fourth coupling waveguides 15b1-b4 with respect to the wavelengths $\lambda_{1-4}$. The inclination angle is sufficiently small so as to allow total internal reflection and to avoid perturbation effects within the MMI waveguide 5.

In this embodiment the third coupling waveguide 11b and the fourth coupling waveguides 15b1-b4 are coupled to opposite sides of the MMI waveguide 5, but in an alternative embodiment the third coupling waveguide 11b and the fourth coupling waveguides 15b1-b4 could be coupled to the same sidewall 8 of the MMI waveguide 5.

In this embodiment the first and third coupling waveguides 11a, 11b are coupled to the same side of the MMI waveguide 5.

In this embodiment the second and fourth coupling waveguides 15a1-a4, 15b1-b4 are coupled to the same side of the MMI waveguide 5.

In this embodiment the first coupling waveguide 11a and the second coupling waveguides 15a1-a4 are arranged such that a transmission direction therebetween is in a first direction, and the third coupling waveguide 11b and the fourth coupling waveguides 15b1-b4 are arranged such that a transmission direction therebetween is in a second direction, opposite to the first direction.

In another embodiment, as illustrated in FIG. 3, the WDM 3 of FIG. 2 can be configured such that the first and second AMMIs each operate as a multiplexer (MUX).

In this embodiment the first and third coupling waveguides 11a, 11b are output waveguides for the first and second AMMIs, at which respective ones of first and second multiplexed output signals, each comprising optical channels having a plurality of wavelengths $\lambda_{1-4}$, are received from the MMI waveguide 5, and the second and fourth coupling waveguides 15a1-a4, 15b1-b4 are input waveguides, at which optical signals having a plurality of wavelengths $\lambda_{1-4}$ are coupled to the MMI waveguide 5, with the MMI waveguide 5 acting to combine the optical signals of the plurality of wavelengths $\lambda_{1-4}$ into a single optical signal comprising optical channels having the plurality of wavelengths $\lambda_{1-4}$.

In alternative embodiments the first and third coupling waveguides 11a, 11b can be configured in accordance with the arrangements of any of FIGS. 2(a) to (d).

In a further embodiment the WDM 3 of FIG. 2 can be configured such that the first AMMI operates as one of a demultiplexer or multiplexer and the second AMMI operates as the other of a demultiplexer or multiplexer.

Figure 4:
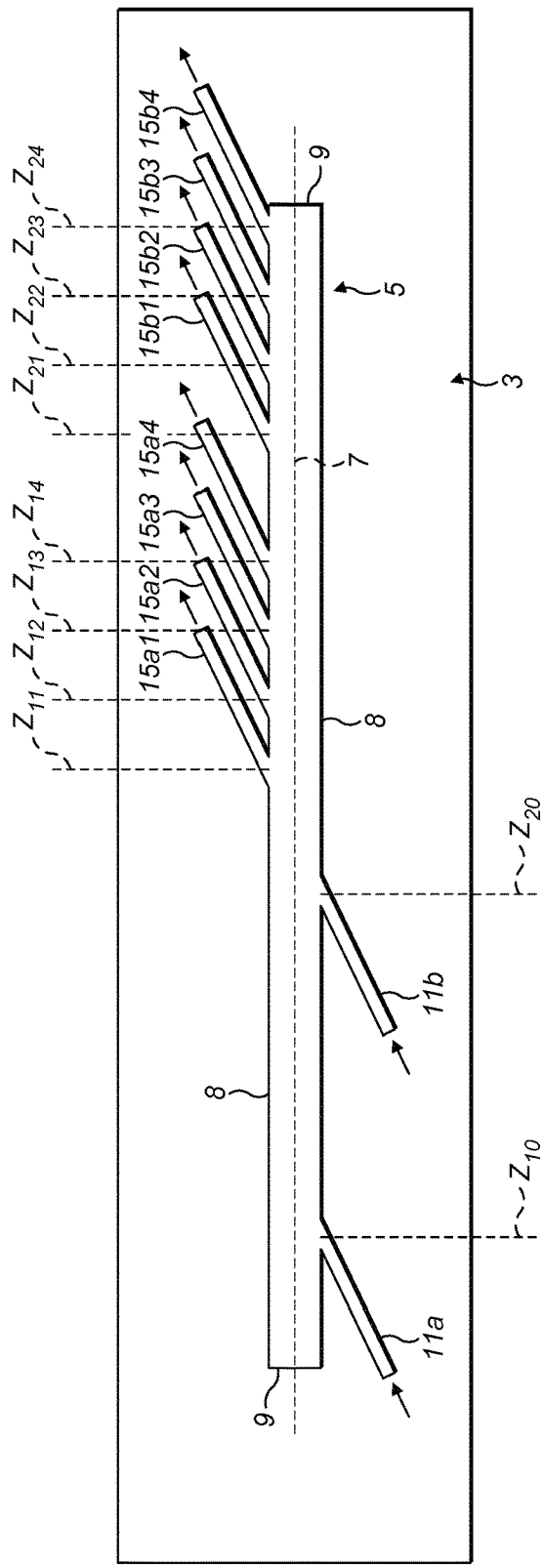
FIG. 4 illustrates a plan view of an optical (de)multiplexer in accordance with a second embodiment of the present invention, with the first and second AMMIs each operating as a demultiplexer (DEMUX)

FIG. 4 illustrates a wavelength division (de)multiplexer (WDM) in accordance with a second embodiment of the present invention.

The WDM 3 of this embodiment is very similar to the WDM 3 of the first-described embodiment, and thus, in order to avoid unnecessary duplication of description, only differences will be described in detail, with like parts being designated by like reference signs.

The WDM 3 of this embodiment differs from the WDM 3 of the first-described embodiment in that the transmission directions of the first and second AMMIs are the same. In this embodiment the second and fourth coupling waveguides 15a1-a4, 15b1-b4 of the first and second AMMIs are located in spaced, non-overlapping relation in a transmission direction.

In an alternative embodiment the channels of the second and fourth coupling waveguides 15a1-a4, 15b1-b4 of the first and second AMMIs could be arranged, in interleaved, overlapping relation in a transmission direction.

In alternative embodiments the first and third coupling waveguides 11a, 11b can be configured in accordance with the arrangements of any of FIGS. 2(a) to (d).

Figure 5:
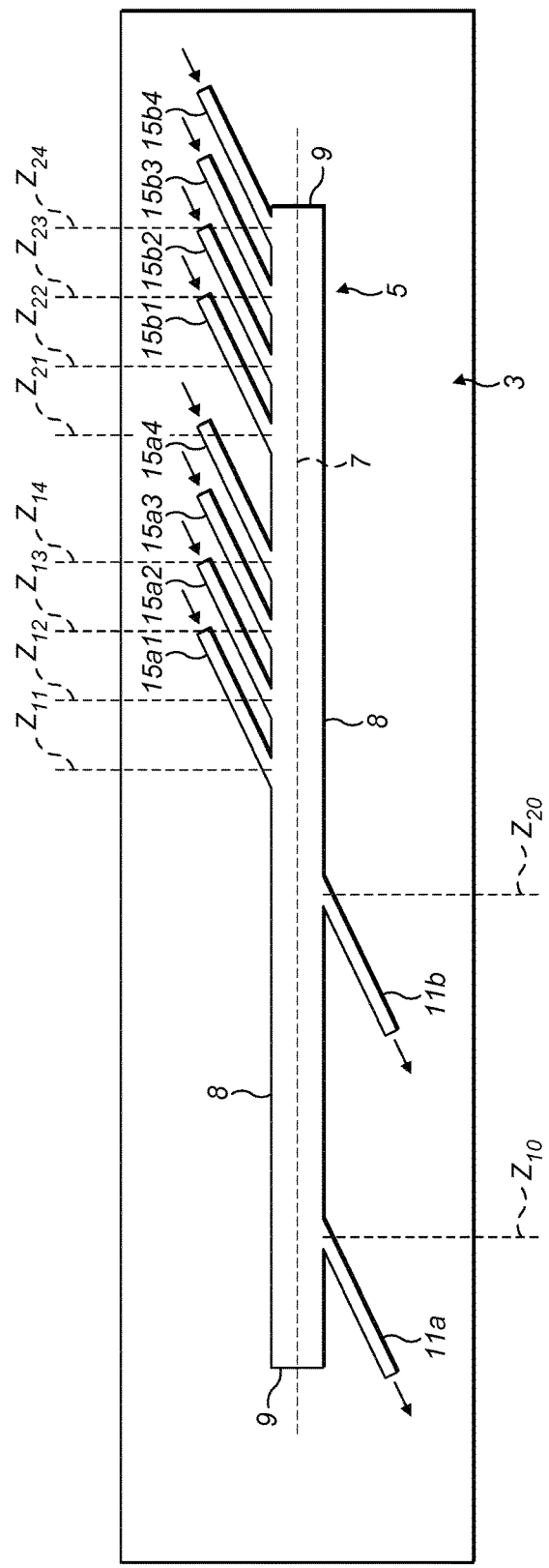
FIG. 5 illustrates a plan view of the optical (de)multiplexer (WDM) of FIG. 4, with the first and second AMMIs each operating as a multiplexer (MUX)

In another embodiment, as illustrated in FIG. 5, the WDM 3 of FIG. 4 can be configured such that the first and second AMMIs each operate as a multiplexer (MUX), similarly to the operation of the WDM of FIG. 3.

In a further embodiment the WDM 3 of FIG. 4 can be configured such that the first AMMI operates as one of a demultiplexer or multiplexer and the second AMMI operates as the other of a demultiplexer or multiplexer.

Figure 6:
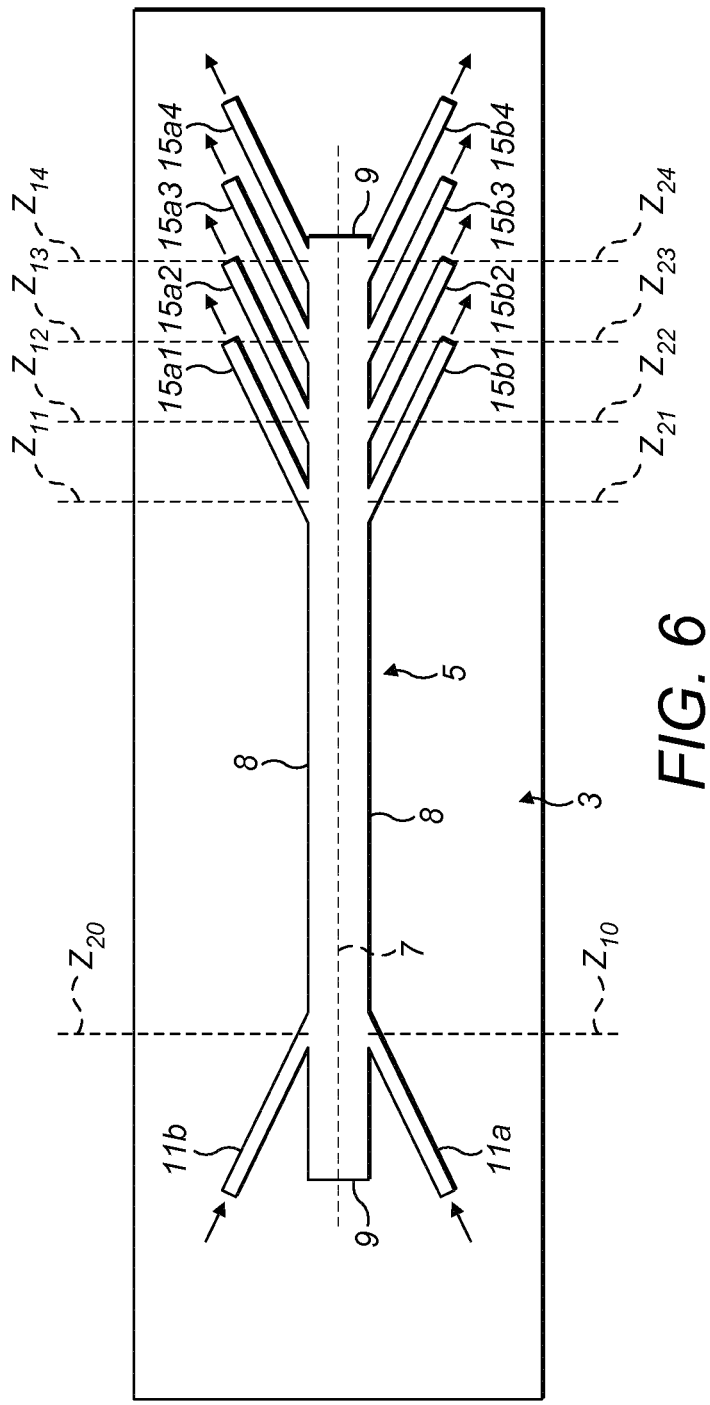
FIG. 6 illustrates a plan view of an optical (de)multiplexer (WDM) in accordance with a third embodiment of the present invention, with the first and second AMMIs each operating as a demultiplexer (DEMUX)

FIG. 6 illustrates a wavelength division (de)multiplexer (WDM) in accordance with a third embodiment of the present invention.

The WDM 3 of this embodiment is very similar to the WDM 3 of the first-described embodiment, and thus, in order to avoid unnecessary duplication of description, only differences will be described in detail, with like parts being designated by like reference signs.

The WDM 3 of this embodiment differs from the WDM 3 of the first-described embodiment in that the first and third waveguides 11a, 11b of the respective ones of the first and second AMMIs are coupled to opposite sides of the MMI waveguide 5, the second and fourth waveguides 15a1-a4, 15b1-b4 of the respective ones of the first and second AMMIs are coupled to opposite sides of the MMI waveguide 5, and the transmission directions of the first and second AMMIs are the same.

In this embodiment the channels of the second and fourth coupling waveguides 15a1-a4, 15b1-b4 of the respective ones of the first and second AMMIs are in opposite, symmetrical relation in order to reduce cross-talk.

In an alternative embodiment the first coupling waveguide 11a and the second coupling waveguides 15a1-a4 and the third coupling waveguide 11c and the fourth coupling waveguides 15b1-b4 could each be respectively coupled to the same sides of the MMI waveguide 5.

In alternative embodiments the first and third coupling waveguides 11a, 11b can be configured in accordance with the arrangements of any of FIGS. 2(a) to (d).

Figure 7:
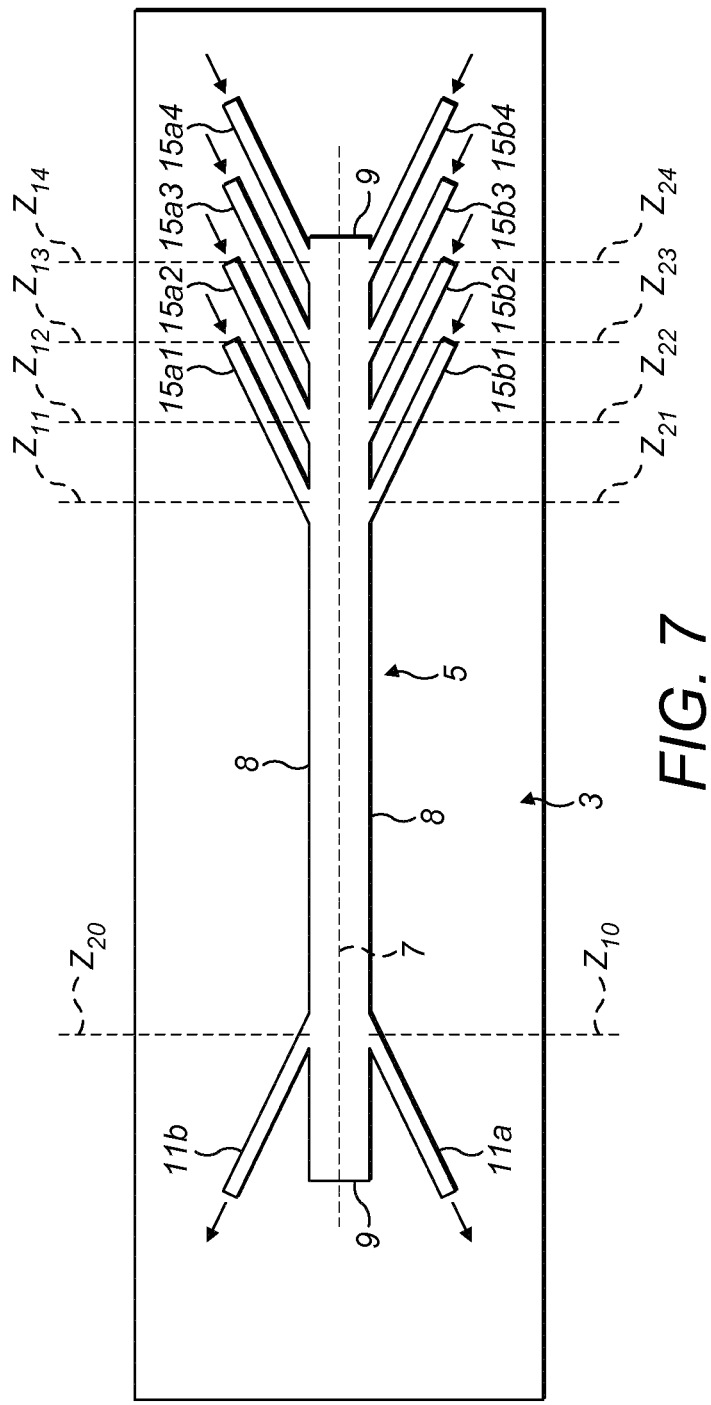
FIG. 7 illustrates a plan view of the optical (de)multiplexer (WDM) of FIG. 6, with the first and second AMMIs each operating as a multiplexer (MUX)

In another embodiment, as illustrated in FIG. 7, the WDM 3 of FIG. 6 can be configured such that the first and second AMMIs each operate as a multiplexer (MUX), similarly to the operation of the WDM 3 of FIG. 3.

In a further embodiment the WDM 3 of FIG. 6 can be configured such that the first AMMI operates as one of a demultiplexer or multiplexer and the second AMMI operates as the other of a demultiplexer or multiplexer.

Figure 8:
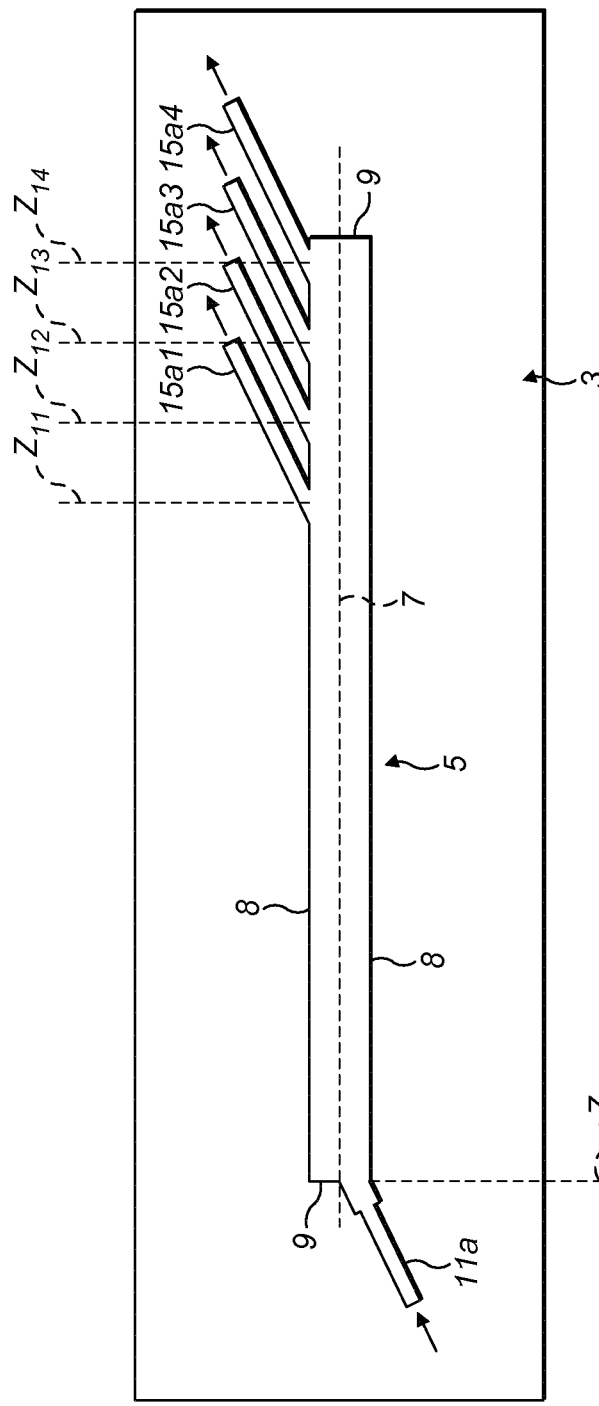
FIG. 8 illustrates a plan view of an optical (de)multiplexer in accordance with a fourth embodiment of the present invention, with the AMMI operating as a demultiplexer (DEMUX)

FIG. 8 illustrates a wavelength division (de)multiplexer (WDM) 3 in accordance with a fourth embodiment of the present invention.

In this embodiment the WDM 3 is a semiconductor structure, here implemented in silicon.

The WDM 3 comprises a multimode interference (MMI) waveguide 5 having a central, longitudinal axis 7, which operates to demultiplex an optical signal having optical channels of a plurality of wavelengths $\lambda_{1-4}$ or multiplex optical signals of a plurality of wavelengths $\lambda_{1-4}$ into an optical signal having optical channels of the plurality of wavelengths $\lambda_{1-4}$.

In this embodiment the MMI waveguide 5 comprises a planar, elongate rectangular structure having longitudinal sidewalls 8 and lateral endwalls 9.

The WDM 3 comprises a first coupling waveguide 11a which meets the MMI waveguide 5 at a first location $Z_{10}$ and a plurality of second coupling waveguides 15a1-a4 which meet the MMI waveguide 5 at a plurality of spaced second locations $Z_{11}$, $Z_{12}$, $Z_{13}$, $Z_{14}$ in a direction of transmission, with the first coupling waveguide 11a and the plurality of second coupling waveguides 15a1-a4 together providing an angled multimode interferometer (AMMI) which can operate as a demultiplexer, with the first coupling waveguide 11a being an input waveguide and the second coupling waveguides 15a1-a4 being output waveguides, or a multiplexer, with the first coupling waveguide 11a being an output waveguide and the second coupling waveguides 15a1-a4 being input waveguides.

In this embodiment the first coupling waveguide 11a is coupled to an endwall 8 of the MMI waveguide 5.

Figure 8A:
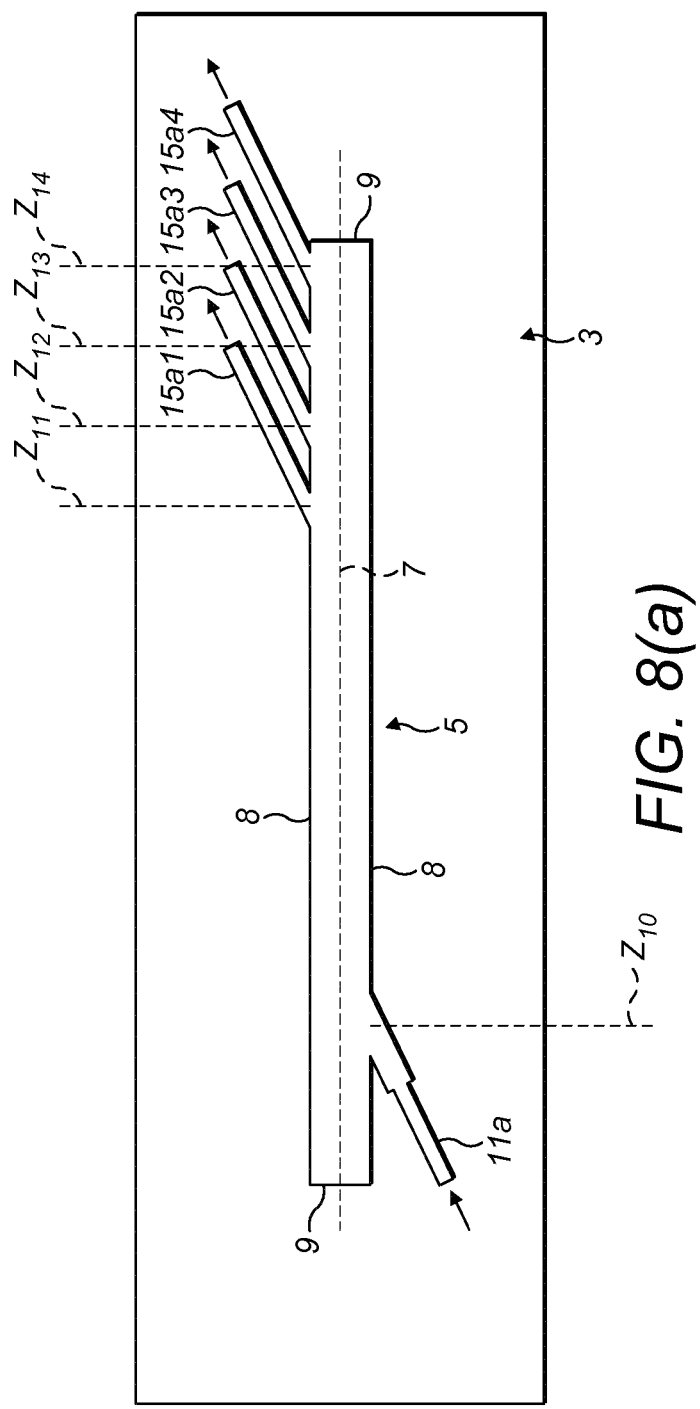
FIG. 8(a) illustrates a plan view of an optical (de)multiplexer as a modification of the (de)multiplexer of FIG. 8.

In one alternative embodiment, as illustrated in FIG. 8(a), the first coupling waveguide 11a could be coupled to a sidewall of the MMI waveguide 5.

Figure 8B:
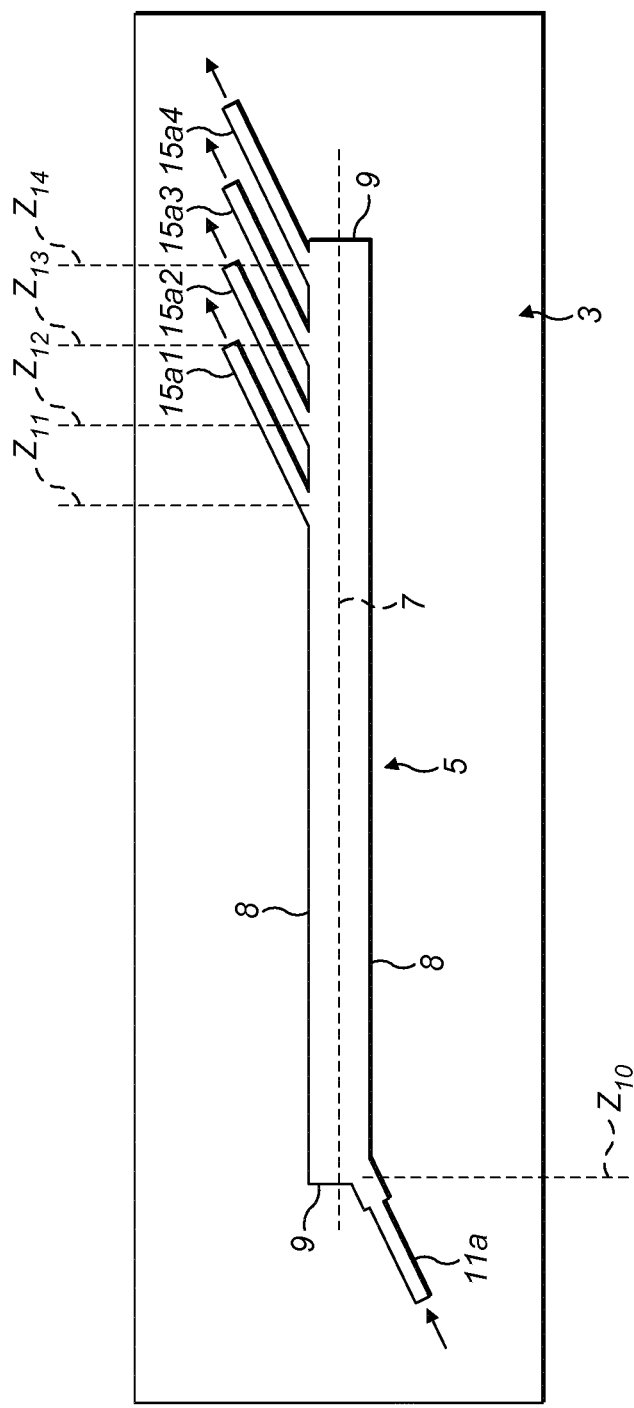
FIG. 8(b) illustrates a plan view of an optical (de)multiplexer as another modification of the optical (de)multiplexer of FIG. 8.

In another alternative embodiment, as illustrated in FIG. 8(b), the first coupling waveguide 11a could be coupled to a junction of a sidewall 8 and an endwall 9 of the MMI waveguide 5.

In this embodiment the first coupling waveguide 11a comprises a stepped waveguide, by which the spatial profile of the input signal which is coupled to the MMI waveguide 5 is broadened, and as a result the spectral profiles at the output channels of the second coupling waveguides 15a1-a4 have a substantially flat-top profile, as represented in FIG. 9.

Figure 8C:
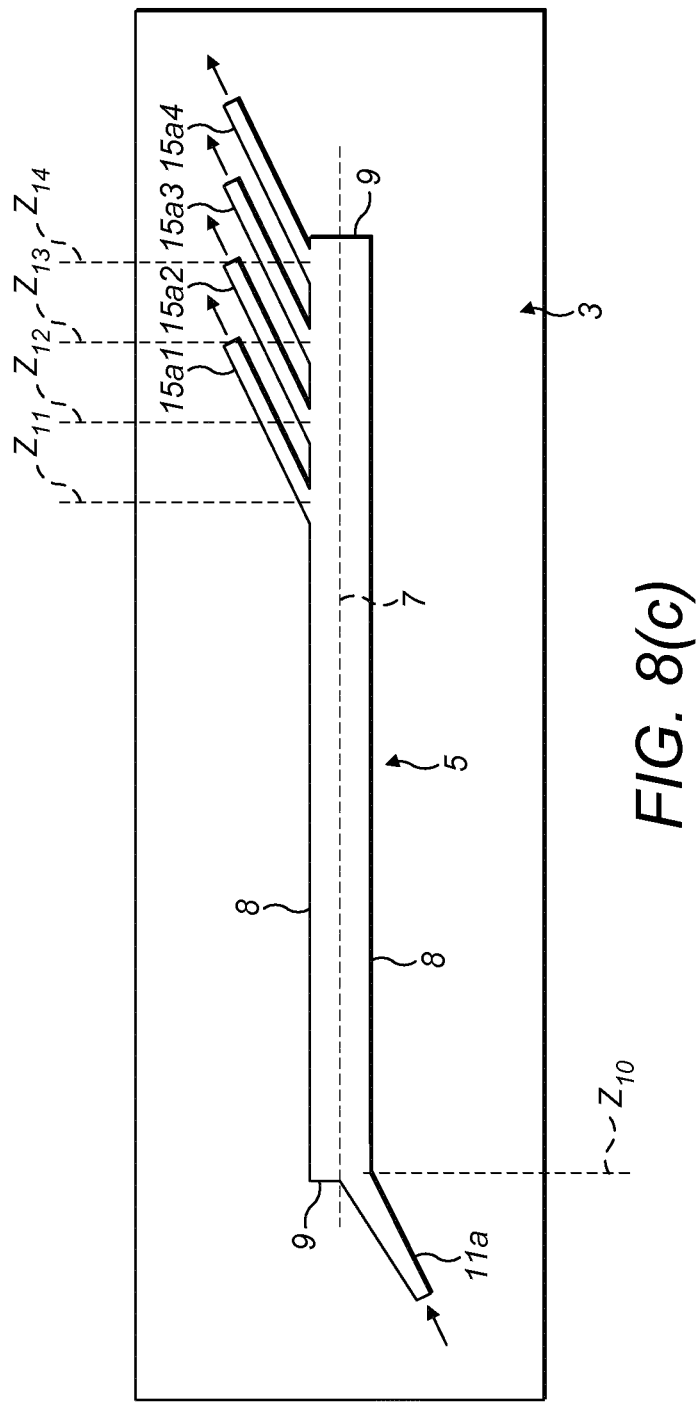
FIG. 8(c) illustrates a plan view of an optical (de)multiplexer as a further modification of the optical (de)multiplexer of FIG. 2.

In another alternative embodiment the first coupling waveguide 11a could be a tapered waveguide, as illustrated in FIG. 8(c), or have any configuration by which the spatial profile of the input signal which is coupled to the MMI waveguide 5 is broadened, here having a substantially flat-top spectral profile.

In this embodiment the second coupling waveguides 15a1-a4 are coupled to a sidewall 8 of the MMI waveguide 5.

In this embodiment the AMMI is operating as a demultiplexer (DEMUX).

With this configuration, multiplexed input radiation, which comprises optical channels having a plurality of wavelengths $\lambda_{1-4}$, is guided by the first coupling waveguide 11a to the MMI waveguide 5 at the first location $Z_{10}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the second locations $Z_{11}$, $Z_{12}$, $Z_{13}$, $Z_{14}$, whereby the spectral components of each of the wavelengths $\lambda_{1-4}$ are coupled into respective ones of the second coupling waveguides 15a1-a4.

The first and second coupling waveguides 11a, 15a1-a4 are each inclined, at a common angle, to the longitudinal axis 7 of the MMI waveguide 5, with the angle and waveguide dimensions being configured to provide high-fidelity mirrored images of the signal at the first coupling waveguide 11a at the second coupling waveguides 15a1-a4 with respect to the wavelengths $\lambda_{1-4}$. The inclination angle is sufficiently small so as to allow total internal reflection and to avoid perturbation effects within the MMI waveguide 5.

In this embodiment the first coupling waveguide 11a and the second coupling waveguides 15a1-a4 are coupled to opposite sides of the MMI waveguide 5, but in an alternative embodiment the first coupling waveguide 11a and the second coupling waveguides 15a1-a4 could be coupled to the same side of the MMI waveguide 5.

In another embodiment, as illustrated in FIG. 10, the WDM 3 of FIG. 8 can be configured such that the AMMI operates as a multiplexer (MUX).

Figure 11:
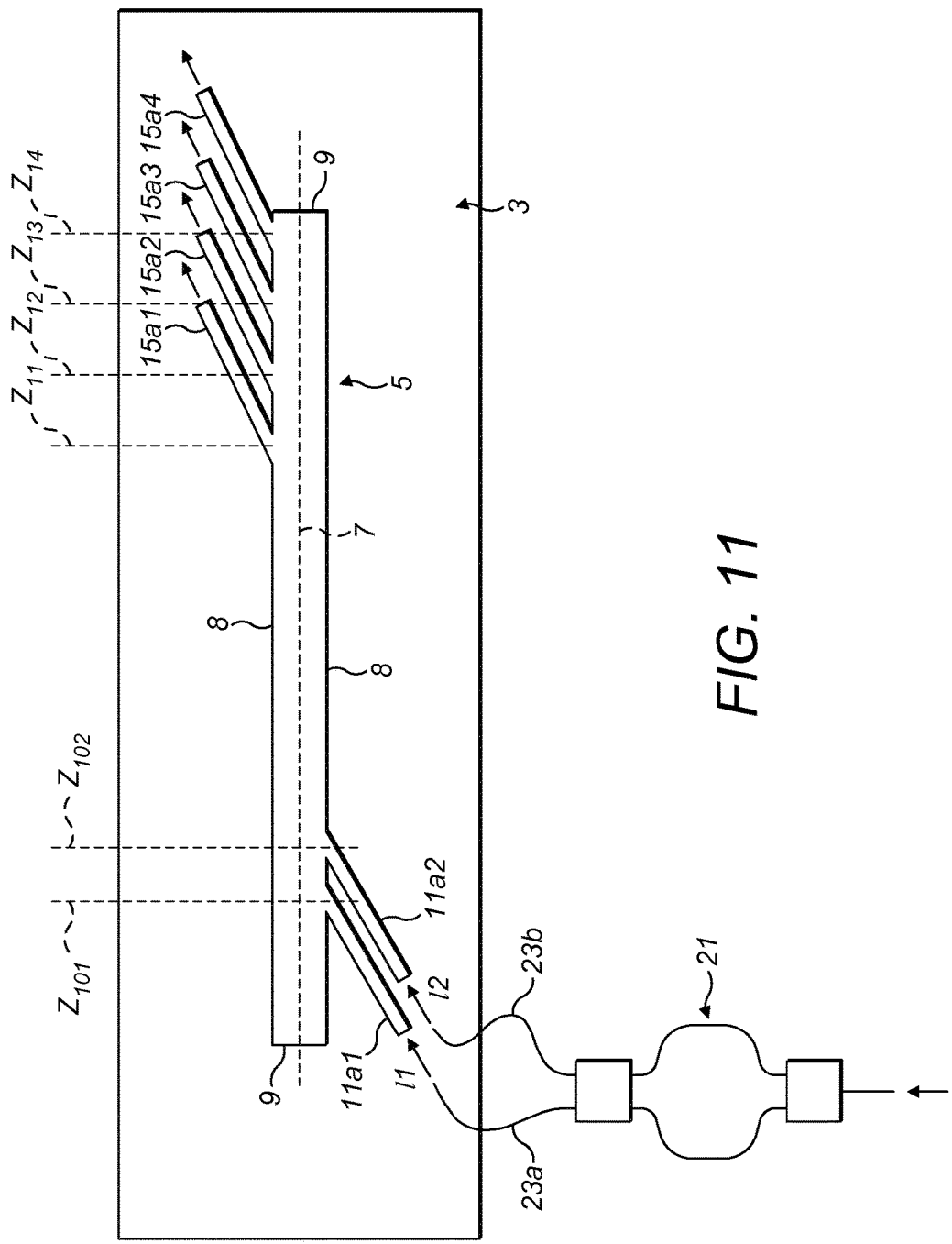
FIG. 11 illustrates a plan view of an optical (de)multiplexer in accordance with a fourth embodiment of the present invention, with the AMMI operating as a demultiplexer (DEMUX)

FIG. 11 illustrates a wavelength division (de)multiplexer (WDM) 3 in accordance with a fifth embodiment of the present invention.

In this embodiment the WDM 3 is a semiconductor structure, here implemented in silicon.

The WDM 3 comprises a multimode interference (MMI) waveguide 5 having a central, longitudinal axis 7, which operates to demultiplex an optical signal having optical channels of a plurality of wavelengths $\lambda_{1-4}$ or multiplex optical signals of a plurality of wavelengths $\lambda_{1-4}$ into an optical signal having optical channels of the plurality of wavelengths $\lambda_{1-4}$.

In this embodiment the MMI waveguide 5 comprises a planar, elongate rectangular structure having longitudinal sidewalls 8 and lateral endwalls 9.

The WDM 3 comprises a plurality of, in this embodiment two, first coupling waveguides 11a1, 11a2 which meet the MMI waveguide 5 at first locations $Z_{101}$, $Z_{102}$ spaced in a direction of transmission and a plurality of second coupling waveguides 15a1-a4 which meet the MMI waveguide 5 at second locations $Z_{11}$, $Z_{12}$, $Z_{13}$, $Z_{14}$ spaced in the direction of transmission and spaced downstream of the first coupling waveguides 11a1, 11a2, with the first coupling waveguides 11a1, 11a2 and the second coupling waveguides 15a1-a4 together providing an angled multimode interferometer (AMMI) which can operate as a demultiplexer, with the first coupling waveguides 11a1, 11a2 being input waveguides and the second coupling waveguides 15a1-a4 being output waveguides, or a multiplexer, with the first coupling waveguides 11a1, 11a2 being output waveguides and the plurality of second coupling waveguides 15a1-a4 being input waveguides.

In this embodiment the first coupling waveguides 11a1, 11a2 are coupled to a sidewall 8 of the MMI waveguide 5.

In alternative embodiments, following the embodiments of FIGS. 2(a) and 2(b), the first coupling waveguides 11a1, 11a2 could be coupled to an endwall 9 of the MMI waveguide 5 or to a junction of a sidewall 8 and an endwall 9 of the MMI waveguide 5.

In this embodiment the first coupling waveguides 11a1, 11a2 are configured to receive signals of different wavelength components I1, I2, each comprising optical channels having a plurality of wavelengths $\lambda_{1-4}$, which, with appropriate signal waveforms and an appropriate spacing both between the first coupling waveguides 11a1, 11a2 and in relation to the second coupling waveguides 15a1-a4, provides for a substantially flat-top spectral profile to signals transmitted between the first coupling waveguides 11a1, 11a2 and the second coupling waveguides 15a1-a4.

In this embodiment the first coupling waveguides 11a1, 11a2 are coupled to an imbalanced Mach-Zehnder Interferometer (MZI) 21 which produces two peak transmission wavelength components I1, I2 at output ports 23a, 23b coupled to the first coupling waveguides 11a1, 11a2.

In alternative embodiments the MZI 23 could be provided by a photonic structure which provides a 1×n output, in this embodiment a 1×2 output, in which the output signals have an equal intensity and a phase difference.

In this embodiment the second coupling waveguides 15a1-a4 are coupled to a sidewall 8 of the MMI waveguide 5.

In this embodiment the AMMI is operating as a demultiplexer (DEMUX).

With this configuration, multiplexed input radiation having first and second wavelength components I1, I2, which comprises optical channels having a plurality of wavelengths $\lambda_{1-4}$, is guided by the first coupling waveguides 11a1, 11a2 to the MMI waveguide 5 at the first locations $Z_{101}$, $Z_{102}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the second locations $Z_{11}$, $Z_{12}$, $Z_{13}$, $Z_{14}$, whereby the spectral components of each of the wavelengths $\lambda_{1-4}$ are coupled into respective ones of the second coupling waveguides 15a1-a4.

The first and second coupling waveguides 11a1, 11a2, 15a1-a4 are each inclined, at a common angle, to the longitudinal axis 7 of the MMI waveguide 5, with the angle and waveguide dimensions being configured to provide high-fidelity mirrored images of the signal at the first coupling waveguides 11a1, 11a2 at the second coupling waveguides 15a1-a4 with respect to the wavelengths $\lambda_{1-4}$. The inclination angle is sufficiently small so as to allow total internal reflection and to avoid perturbation effects within the MMI waveguide 5.

In this embodiment the first coupling waveguides 11a1, 11a2 and the second coupling waveguides 15a1-a4 are coupled to opposite sides of the MMI waveguide 5, but in an alternative embodiment the first coupling waveguides 11a1, 11a2 and the second coupling waveguides 15a1-a4 could be coupled to the same side of the MMI waveguide 5.

Figure 12:
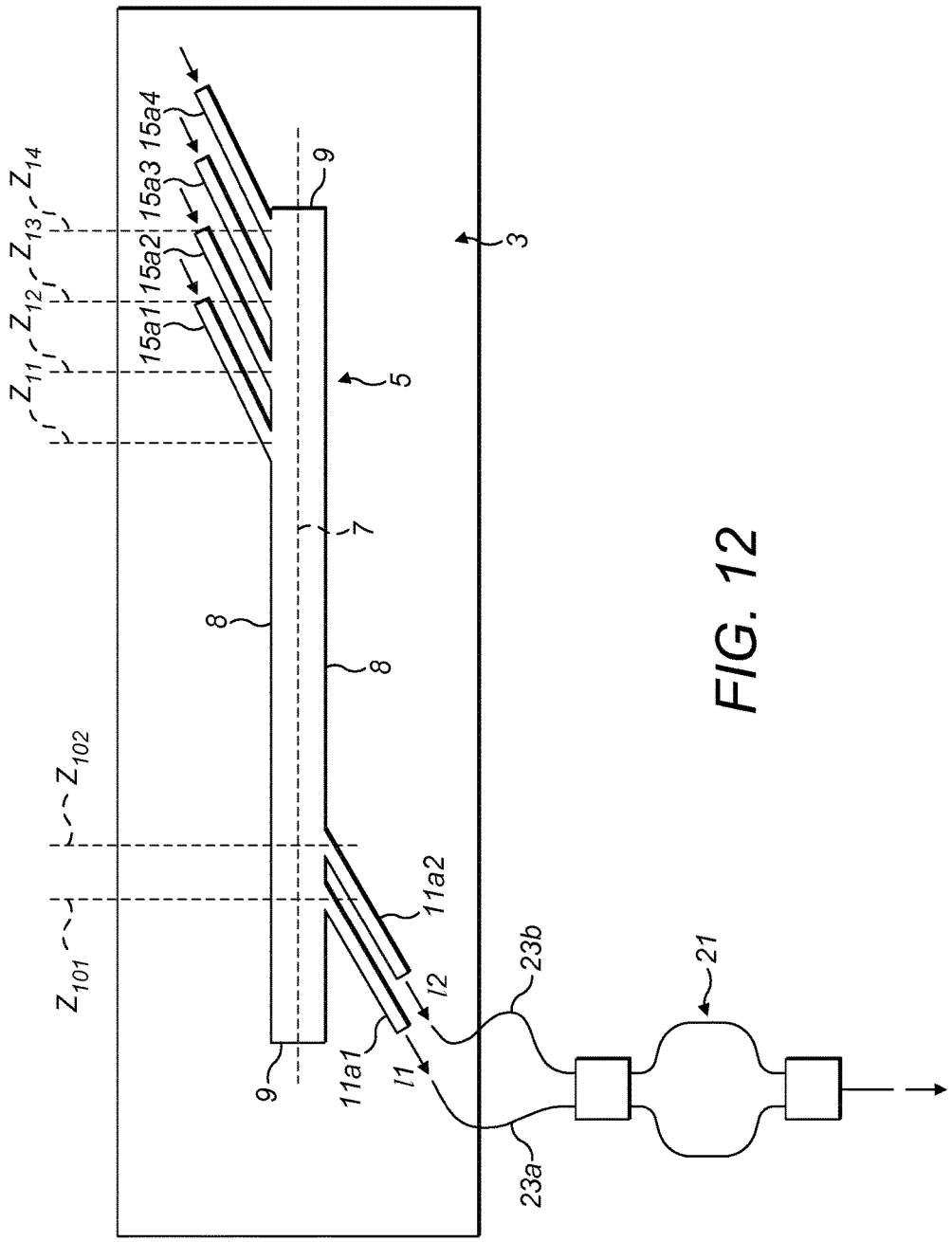
FIG. 12 illustrates a plan view of the optical (de)multiplexer (WDM) of FIG. 11, with the AMMI operating as a multiplexer (MUX)

In another embodiment, as illustrated in FIG. 12, the WDM 3 of FIG. 11 can be configured such that the AMMI operates as a multiplexer (MUX).

Figure 13:
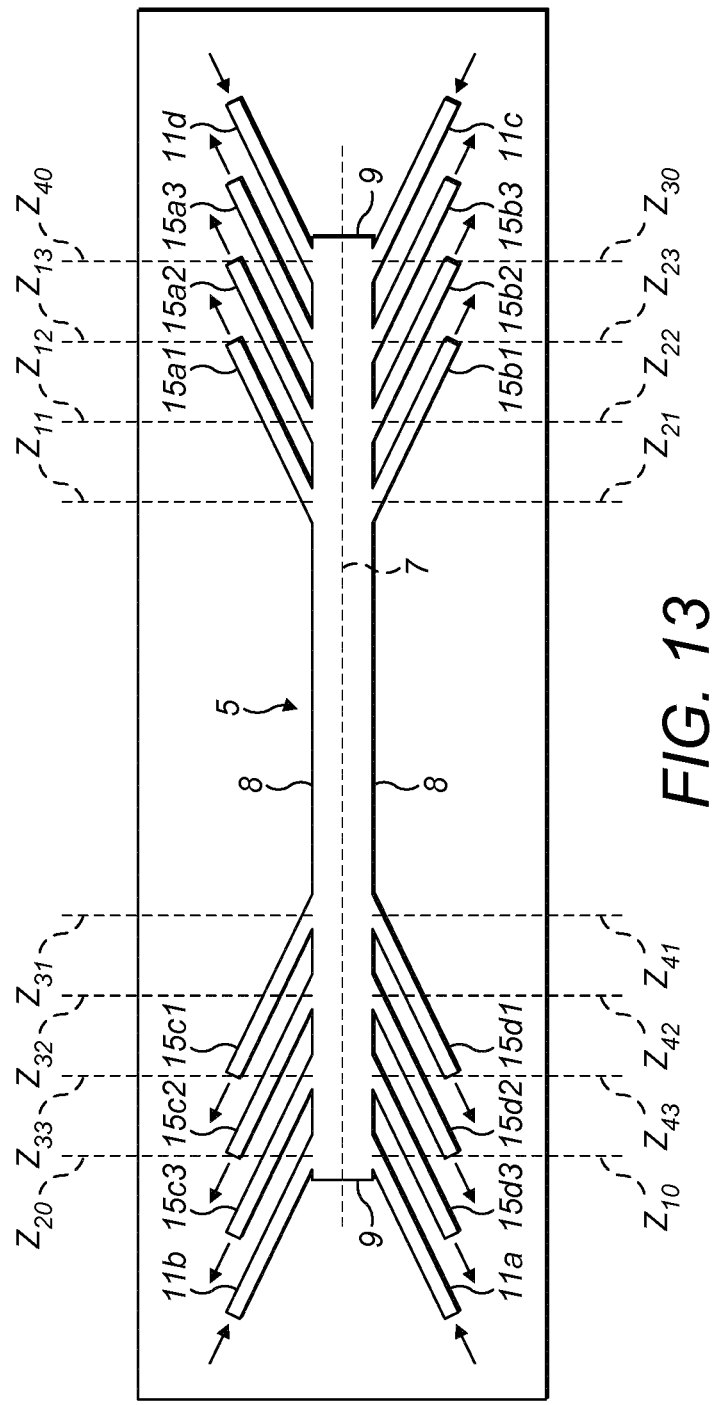
FIG. 13 illustrates a plan view of an optical (de)multiplexer in accordance with a sixth embodiment of the present invention, with the AMMIs operating as demultiplexers (DEMUX)

FIG. 13 illustrates a wavelength division multiplexer/demultiplexer (WDM) in accordance with a sixth embodiment of the present invention.

The WDM 3 of this embodiment is very similar to the WDM 3 of the first-described embodiment, and thus, in order to avoid unnecessary duplication of description, only differences will be described in detail, with like parts being designated by like reference signs.

The WDM 3 of this embodiment differs from the WDM 3 of the first-described embodiment in comprising four angled multimode interferometers (AMMI) on the shared MMI waveguide 5.

In this embodiment the AMMIs each comprise a first coupling waveguide 11a-d which meets the MMI waveguide 5 at a respective first location $Z_{10}$, $Z_{20}$, $Z_{30}$, $Z_{40}$ and a plurality of second coupling waveguides 15a1-a4, 15b1-b4, 15c1-c4, 15d1-d4 which meet the MMI waveguide 5 at a plurality of respective second locations $Z_{11, 12, 13}$, $Z_{21, 22, 23}$, $Z_{31, 32, 33}$, $Z_{41, 42, 43}$, in a direction of transmission.

Figure 14:
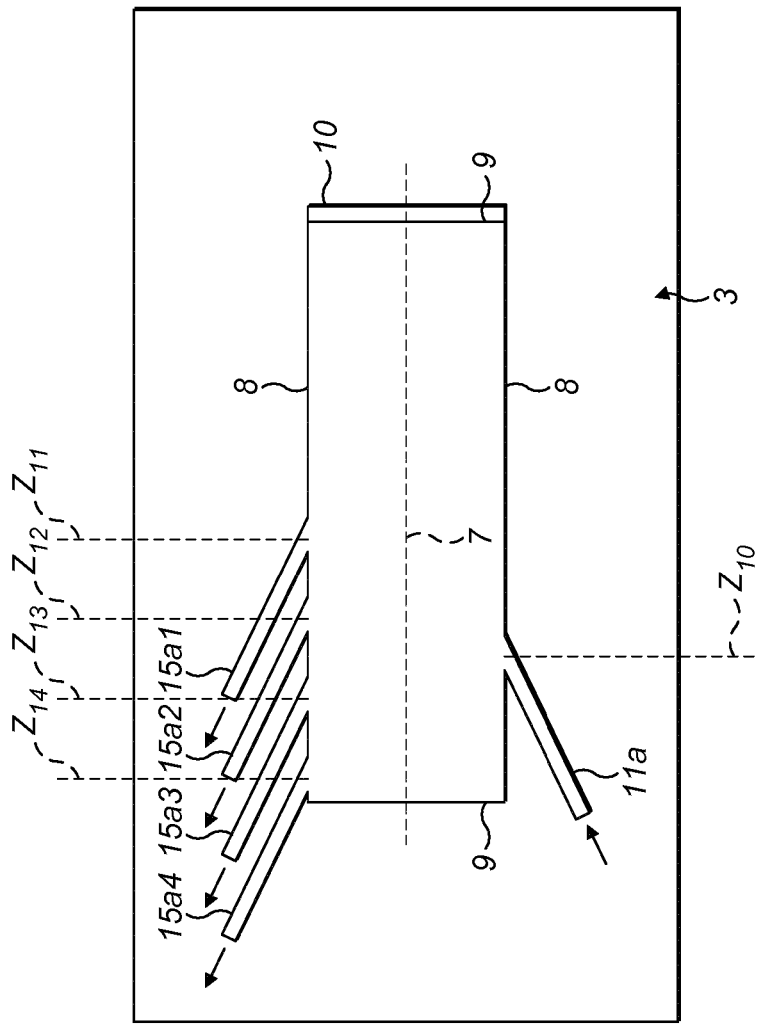
FIG. 14 illustrates a plan view of an optical (de)multiplexer in accordance with a seventh embodiment of the present invention, with the AMMI operating as a demultiplexer (DEMUX)

FIG. 14 illustrates a wavelength division (de)multiplexer (WDM) 3 in accordance with a seventh embodiment of the present invention.

In this embodiment the WDM 3 is a semiconductor structure, here implemented in silicon.

The WDM 3 comprises a multimode interference (MMI) waveguide 5 having a central, longitudinal axis 7, which operates to demultiplex an optical signal having optical channels of a plurality of wavelengths $\lambda_{1-4}$ or multiplex optical signals of a plurality of wavelengths $\lambda_{1-4}$ into an optical signal having optical channels of the plurality of wavelengths $\lambda_{1-4}$.

In this embodiment the MMI waveguide 5 comprises a planar, elongate rectangular structure having longitudinal sidewalls 8 and lateral endwalls 9, and a reflector 10 at one, the distal, of the endwalls 9 in relation to a direction of transmission of the input optical signal or signals, which reflector 10 acts to reflect any transmitted optical signal. With this configuration, the MMI waveguide 5 can have a length substantially half that conventionally required, leading to reduced cost and material usage.

In this embodiment the reflector 10 comprises a reflective film or layer, but could alternatively be provided by an adjoining structure.

The WDM 3 comprises a first coupling waveguide 11a which meets the MMI waveguide 5 at a first location $Z_{10}$ in a first direction and a plurality of second coupling waveguides 15a1-a4 which meet the MMI waveguide 5 at a plurality of spaced second locations $Z_{11}$, $Z_{12}$, $Z_{13}$, $Z_{14}$ in a second direction, being opposite to the first direction, with the first coupling waveguide 11a and the plurality of second coupling waveguides 15a1-a4 together providing an angled multimode interferometer (AMMI) which can operate as a demultiplexer, with the first coupling waveguide 11a being an input waveguide and the second coupling waveguides 15a1-a4 being output waveguides, or a multiplexer, with the first coupling waveguide 11a being an output waveguide and the second coupling waveguides 15a1-a4 being input waveguides.

In this embodiment the first coupling waveguide 11a is coupled to a sidewall 8 of the MMI waveguide 5.

In this embodiment the second coupling waveguides 15a1-a4 are coupled to a sidewall 8 of the MMI waveguide 5.

In this embodiment the first coupling waveguide 11a and the second coupling waveguides 15a1-a4 are coupled to opposite sidewalls 8 of the MMI waveguide 5.

Figure 14A:
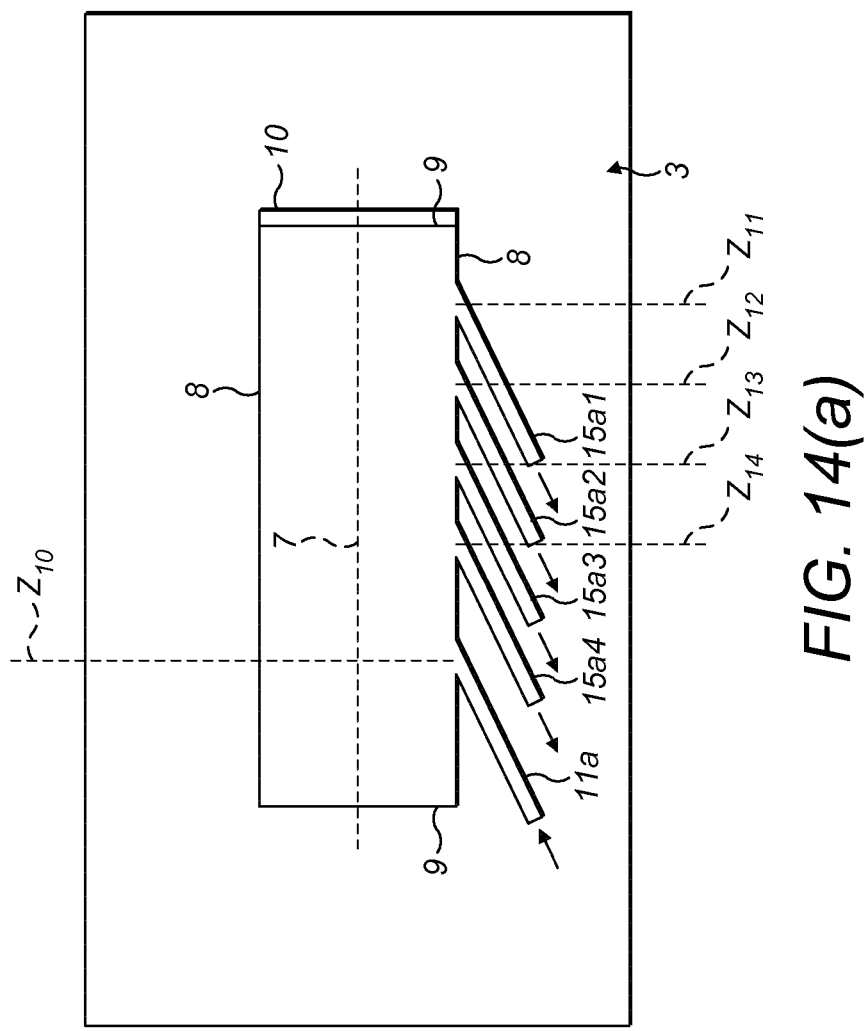
FIG. 14(a) illustrates a plan view of an optical (de)multiplexer as a modification of the (de)multiplexer of FIG. 14.

In an alternative embodiment, as illustrated in FIG. 14(a) the first coupling waveguide 11a and the second coupling waveguides 15a1-a4 could be coupled to a common or the same sidewall 8 of the MMI waveguide 5.

In this embodiment the AMMI is operating as a demultiplexer (DEMUX).

With this configuration, multiplexed input radiation, which comprises optical channels having a plurality of wavelengths $\lambda_{1-4}$, is guided by the first coupling waveguide 11a to the MMI waveguide 5 at the first location $Z_{10}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the second locations $Z_{11}$, $Z_{12}$, $Z_{13}$, $Z_{14}$, whereby the spectral components of each of the wavelengths $\lambda_{1-4}$ are coupled into respective ones of the second coupling waveguides 15a1-a4.

The first and second coupling waveguides 11a, 15a1-a4 are each inclined, at a common angle, to the longitudinal axis 7 of the MMI waveguide 5, with the angle and waveguide dimensions being configured to provide high-fidelity mirrored images of the signal at the first coupling waveguide 11a at the second coupling waveguides 15a1-a4 with respect to the wavelengths $\lambda_{1-4}$. The inclination angle is sufficiently small so as to allow total internal reflection and to avoid perturbation effects within the MMI waveguide 5.

Figure 15:
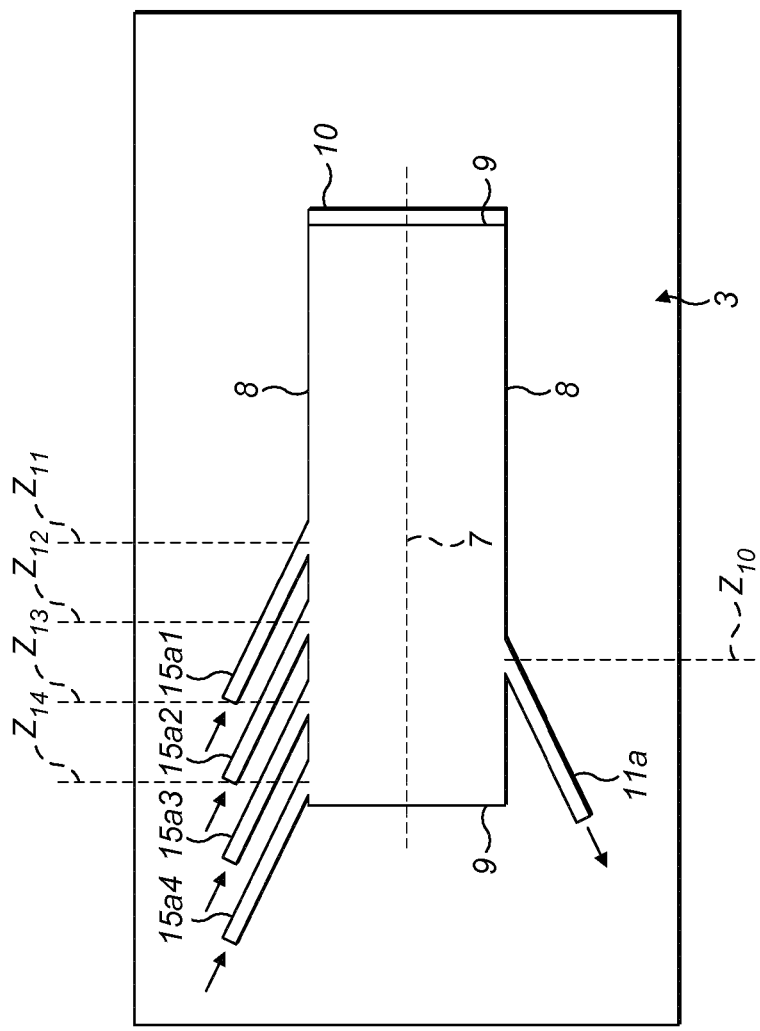
FIG. 15 illustrates a plan view of the optical (de)multiplexer (WDM) of FIG. 14, with the AMMI operating as a multiplexer (MUX)

In another embodiment, as illustrated in FIG. 15, the WDM 3 of FIG. 14 can be configured such that the AMMI operates as a multiplexer (MUX).

Figure 16:
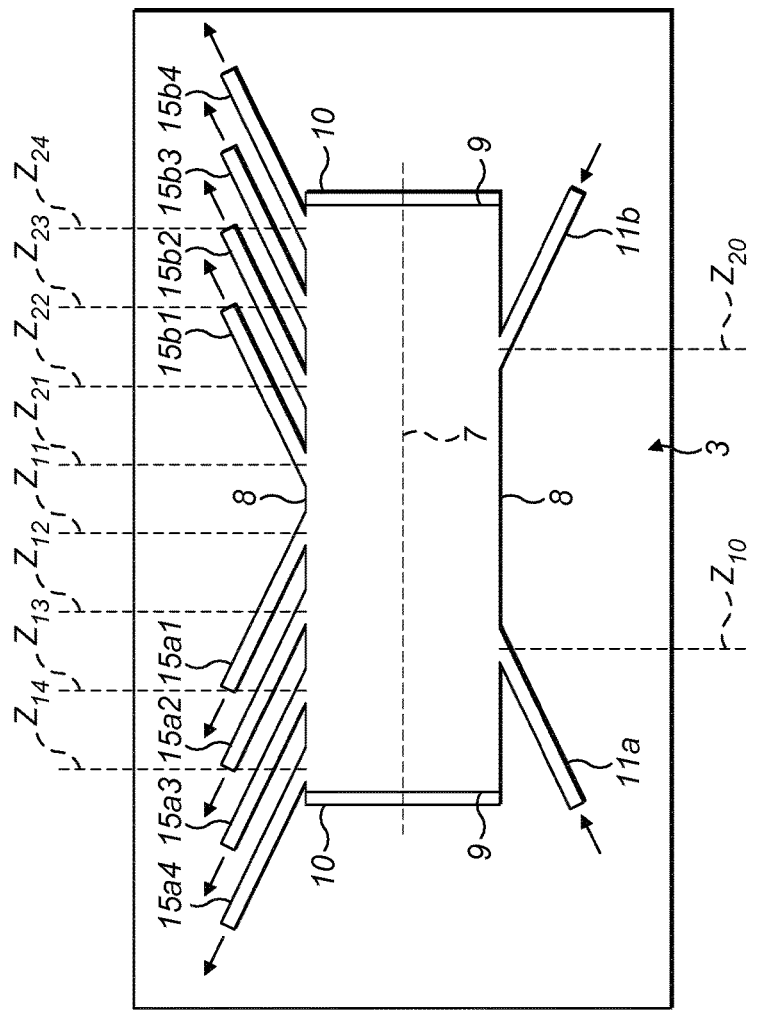
FIG. 16 illustrates a plan view of an optical (de)multiplexer in accordance with an eighth embodiment of the present invention, with each of the first and second AMMIs operating as a demultiplexer (DEMUX)

FIG. 16 illustrates a wavelength division (de)multiplexer (WDM) 3 in accordance with an eighth embodiment of the present invention.

In this embodiment the WDM 3 is a semiconductor structure, here implemented in silicon.

The WDM 3 comprises a multimode interference (MMI) waveguide 5 having a central, longitudinal axis 7, which operates to demultiplex an optical signal having optical channels of a plurality of wavelengths $\lambda_{1-4}$ or multiplex optical signals of a plurality of wavelengths $\lambda_{1-4}$ into an optical signal having optical channels of the plurality of wavelengths $\lambda_{1-4}$.

In this embodiment the MMI waveguide 5 comprises a planar, elongate rectangular structure having longitudinal sidewalls 8 and lateral endwalls 9, and first and second reflectors 10 at respective ones of the endwalls 9, which reflectors 10 act to reflect any optical signal as transmitted thereto. With this configuration, the MMI waveguide 5 can have a length substantially half that conventionally required, leading to reduced cost and material usage, and also implement a plurality of (de)multiplexers in the same MMI waveguide 5.

In this embodiment the reflectors 10 each comprise a reflective film or layer, but could alternatively be provided by an adjoining structure.

The WDM 3 comprises a first coupling waveguide 11a which meets the MMI waveguide 5 at a first location $Z_{10}$ in a first direction and a plurality of second coupling waveguides 15a1-a4 which meet the MMI waveguide 5 at a plurality of spaced second locations $Z_{11}$, $Z_{12}$, $Z_{13}$, $Z_{14}$ in a second direction, being opposite to the first direction, with the first coupling waveguide 11a and the plurality of second coupling waveguides 15a1-a4 together providing an angled multimode interferometer (AMMI) which can operate as a demultiplexer, with the first coupling waveguide 11a being an input waveguide and the second coupling waveguides 15a1-a4 being output waveguides, or a multiplexer, with the first coupling waveguide 11a being an output waveguide and the second coupling waveguides 15a1-a4 being input waveguides.

In this embodiment the first coupling waveguide 11a is coupled to a sidewall 8 of the MMI waveguide 5.

In this embodiment the second coupling waveguides 15a1-a4 are coupled to a sidewall 8 of the MMI waveguide 5.

In this embodiment the first coupling waveguide 11a and the second coupling waveguides 15a1-a4 are coupled to opposite sidewalls 8 of the MMI waveguide 5.

Figure 16A:
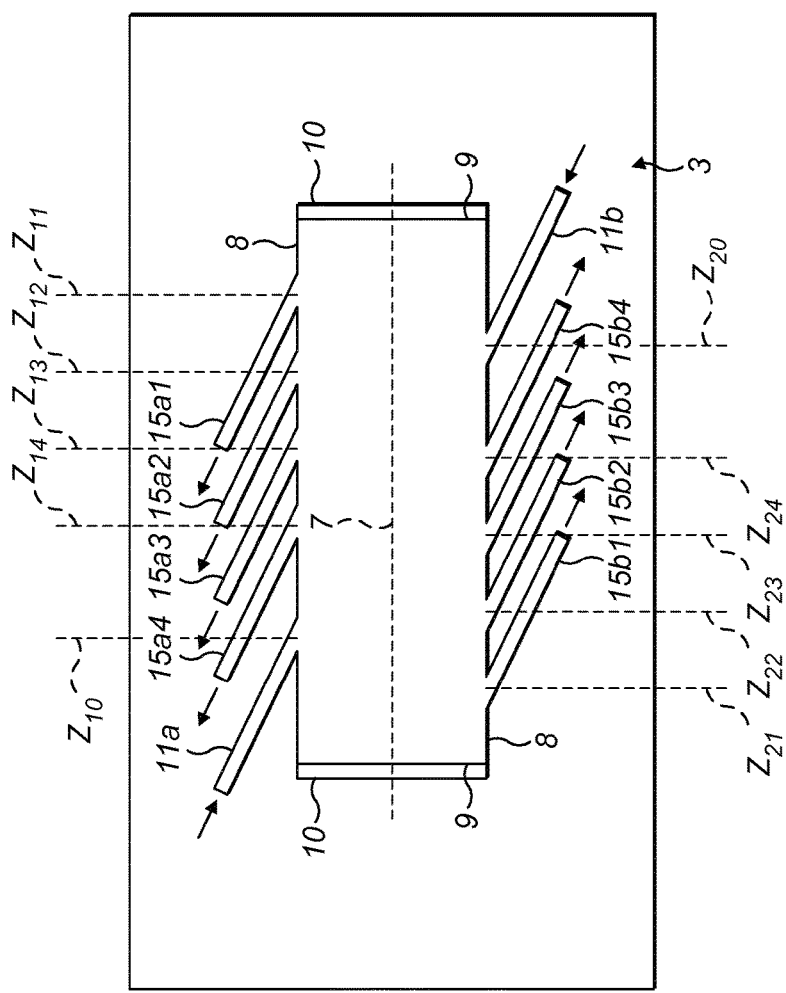
FIG. 16(a) illustrates a plan view of an optical (de)multiplexer as a modification of the (de)multiplexer of FIG. 16.
Figure 18:
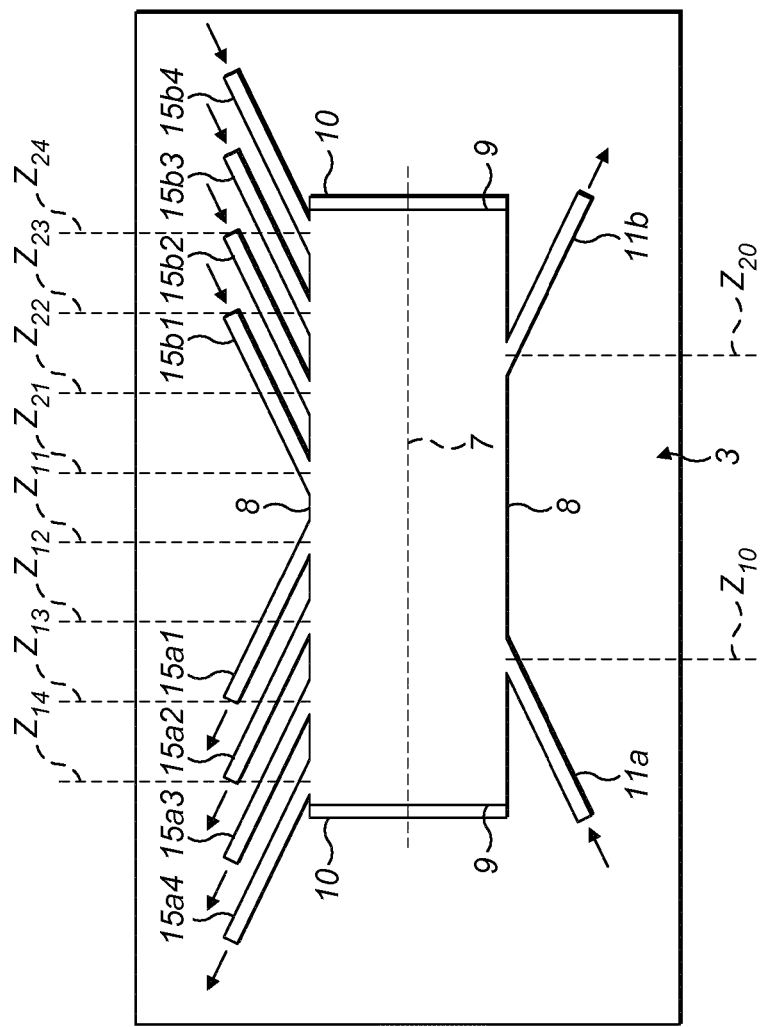
FIG. 18 illustrates a plan view of the optical (de)multiplexer (WDM) of FIG. 16, with the first AMMI operating as a demultiplexer (DEMUX) and the second AMMI operating as a multiplexer (MUX).

In an alternative embodiment, as illustrated in FIG. 16(a), the first coupling waveguide 11a and the second coupling waveguides 15a1-a4 could be coupled to a common or the same sidewall 8 of the MMI waveguide 5.

In this embodiment the first AMMI is operating as a demultiplexer (DEMUX).

With this configuration, multiplexed input radiation, which comprises optical channels having a plurality of wavelengths $\lambda_{1-4}$, is guided by the first coupling waveguide 11a to the MMI waveguide 5 at the first location $Z_{10}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the second locations $Z_{11}$, $Z_{12}$, $Z_{13}$, $Z_14$, whereby the spectral components of each of the wavelengths $\lambda_{1-4}$ are coupled into respective ones of the second coupling waveguides 15a1-a4.

The first and second coupling waveguides 11a, 15a1-a4 are each inclined, at a common angle, to the longitudinal axis 7 of the MMI waveguide 5, with the angle and waveguide dimensions being configured to provide high-fidelity mirrored images of the signal at the first coupling waveguide 11a at the second coupling waveguides 15a1-a4 with respect to the wavelengths $\lambda_{1-4}$. The inclination angle is sufficiently small so as to allow total internal reflection and to avoid perturbation effects within the MMI waveguide 5.

The WDM 3 further comprises a third coupling waveguide 11b which meets the MMI waveguide 5 at a third location $Z_{20}$ in the second direction and a plurality of fourth coupling waveguides 15b1-b4 which meet the MMI waveguide 5 at a plurality of spaced fourth locations $Z_{21}$, $Z_{22}$, $Z_{23}$, $Z_{24}$ in the first direction, being opposite to the second direction, with the third coupling waveguide 11b and the fourth coupling waveguides 15b1-b4 together providing a second angled multimode interferometer (AMMI) which can operate as a demultiplexer, with the third coupling waveguide 11b being an input waveguide and the fourth coupling waveguides 15b1-b4 being output waveguides, or a multiplexer, with the third coupling waveguide 11b being an output waveguide and the fourth coupling waveguides 15b1-b4 being input waveguides.

As discussed above, the locations $Z_{20}$, $Z_{21}$, $Z_{22}$, $Z_{23}$, $Z_{24}$ of the third and fourth coupling waveguides 11b, 15b1-b4 are at regions or windows where the perturbation to the interference pattern of the first AMMI is negligible, in one embodiment regions or windows or zero intensity.

In this embodiment the third coupling waveguide 11b is coupled to a sidewall 8 of the MMI waveguide 5, here the same sidewall 8 as the first coupling waveguide 11a.

In this embodiment the fourth coupling waveguides 15b1-b4 are coupled to a sidewall 8 of the MMI waveguide 5, here the same sidewall 8 as the second coupling waveguides 15a1-a4.

In this embodiment the third coupling waveguide 11b and the fourth coupling waveguides 15b1-b4 are coupled to opposite sidewalls 8 of the MMI waveguide 5.

In an alternative embodiment, as illustrated in FIG. 16(a), the third coupling waveguide 11b and the fourth coupling waveguides 15b1-b4 could be coupled to a common or the same sidewall 8 of the MMI waveguide 5.

In this embodiment the second AMMI is operating as a demultiplexer (DEMUX).

With this configuration, multiplexed input radiation, which comprises optical channels having a plurality of wavelengths $\lambda_{1-4}$, is guided by the third coupling waveguide 11b to the MMI waveguide 5 at the third location $Z_{20}$, in which MMI waveguide 5 the spectral components corresponding to each of the wavelengths $\lambda_{1-4}$ are subjected to modal dispersion and inter-modal interference, and this modal dispersion and inter-modal interference yields mirror images of the intensity distribution for the spectral components of each of the wavelengths $\lambda_{1-4}$ at respective ones of the fourth locations $Z_{21}$, $Z_{22}$, $Z_{23}$, $Z_{24}$, whereby the spectral components of each of the wavelengths $\lambda_{1-4}$ are coupled into respective ones of the fourth coupling waveguides 15b1-b4.

The third and fourth coupling waveguides 11b, 15b1-b4 are each inclined, at a common input angle, to the longitudinal axis 7 of the MMI waveguide 5, with the angle and waveguide dimensions being configured to provide high-fidelity mirrored images of the signal at the third coupling waveguide 11b at the fourth coupling waveguides 15b1-b4 with respect to the wavelengths $\lambda_{1-4}$. The inclination angle is sufficiently small so as to allow total internal reflection and to avoid perturbation effects within the MMI waveguide 5.

In this embodiment the first and third coupling waveguides 11a, 11b are coupled to the same side of the MMI waveguide 5.

In this embodiment the second and fourth coupling waveguides 15a1-a4, 15b1-b4 are coupled to the same side of the MMI waveguide 5.

In this embodiment the first and third coupling waveguides 11a, 11b are arranged such that the transmission directions thereof are in opposite directions, being the first and second directions, respectively.

In another embodiment, as illustrated in FIG. 17, the WDM 3 of FIG. 16 can be configured such that the first and second AMMIs each operate as a multiplexer (MUX).

In this embodiment the first and third coupling waveguides 11a, 11b are output waveguides for the first and second AMMIs, at which respective ones of first and second multiplexed output signals, each comprising optical channels having a plurality of wavelengths $\lambda_{1-4}$, are received from the MMI waveguide 5, and the second and fourth coupling waveguides 15a1-a4, 15b1-b4 are input waveguides, at which optical signals having a plurality of wavelengths $\lambda_{1-4}$ are coupled to the MMI waveguide 5, with the MMI waveguide 5 acting to combine the optical signals of the plurality of wavelengths $\lambda_{1-4}$ into a single optical signal comprising optical channels having the plurality of wavelengths $\lambda_{1-4}$.

In a further embodiment the WDM 3 of FIG. 16 can be configured such that the first AMMI operates as one of a demultiplexer or multiplexer and the second AMMI operates as the other of a demultiplexer or multiplexer.

Finally, it will be understood that the present invention has been described in its preferred embodiments and can be modified in many different ways without departing from the scope of the invention as defined by the appended claims.

For example, the first and third coupling waveguides 11a, 11b of the embodiments of FIGS. 2 to 7 and 13 to 18 can have the stepped or tapered form of any of FIGS. 8, 8(a), 8(b) and 8(c).

In addition, for example, the first and third coupling waveguides 11a, 11b of the embodiments of FIGS. 2 to 7 and 13 to 18 can be configured using the MZI 21 or other 1×n photonic structure of the embodiments of FIGS. 11 and 12.

Furthermore, for example, although embodiments have been described as having first and second AMMIs, it will be understood that the present invention can extend to a greater number of AMMIs, where the device structure allows for access to the coupling waveguides at locations where the perturbation to interference pattern is sufficiently low.

Still furthermore, although the illustrated embodiments are directed to wavelength division (de)multiplexers (WDMs), the illustrated embodiments equally have application as polarization (de)multiplexers (PDMs). In addition, the illustrated embodiments can be employed as (de)multiplexers which provide for wavelength division and polarization (de)multiplexing.

The invention claimed is:
1. An optical demultiplexer/multiplexer, comprising:
a multimode interference waveguide;
at least one first coupling waveguide which meets the multimode interference waveguide at least one first location and a plurality of second coupling waveguides which meet the multimode interference waveguide at a plurality of second locations which are spaced in a direction of transmission in relation to the at least one first location, with the at least one first coupling waveguide and the second coupling waveguides together with the multimode interference waveguide providing a first angled multimode interferometer which operates to demultiplex a first optical signal having optical channels of a plurality of wavelengths or multiplex optical signals of a plurality of wavelengths into a first optical signal having optical channels of the plurality of wavelengths;
at least one third coupling waveguide which meets the multimode interference waveguide at least one third location and a plurality of fourth coupling waveguides which meet the multimode interference waveguide at a plurality of fourth locations which are spaced in a direction of transmission in relation to the at least one third location, with the at least one third coupling waveguide and the plurality of fourth coupling waveguides together with the multimode interference waveguide providing a second angled multimode interferometer which operates to demultiplex a second optical signal having optical channels of a plurality of wavelengths or multiplex optical signals of a plurality of wavelengths into a second optical signal having optical channels of the plurality of wavelengths;

whereby the demultiplexer/multiplexer provides for the demultiplexing/multiplexing of first and second optical signals having optical channels of a plurality of wavelengths.

2. The demultiplexer/multiplexer of claim 1, wherein (i) the first and second coupling waveguides are coupled to opposite sides of the multimode interference waveguide, or (ii) the first and second coupling waveguides are coupled to a single, common side of the multimode interference waveguide.

3. The demultiplexer/multiplexer of claim 1, wherein (i) the third and fourth coupling waveguides are coupled to opposite sides of the multimode interference waveguide, or (ii) the third and fourth coupling waveguides are coupled to a single, common side of the multimode interference waveguide.

4. The demultiplexer/multiplexer of claim 1, wherein (i) the first and third coupling waveguides are coupled to a single, common side of the multimode interference waveguide, or (ii) the first and third coupling waveguides are coupled to opposite sides of the multimode interference waveguide.

5. The demultiplexer/multiplexer of claim 1, wherein (i) the second and fourth coupling waveguides are coupled to a single, common side of the multimode interference waveguide, or (ii) the second and fourth coupling waveguides are coupled to opposite sides of the multimode interference waveguide.

6. The demultiplexer/multiplexer of claim 1, wherein (i) the first and second angled multimode interferometers have a single, common transmission direction, or (ii) a transmission direction of the first angled multimode interferometer is opposite to a transmission direction of the second angled multimode interferometer.

7. The demultiplexer/multiplexer of claim 1, wherein (i) the at least one first coupling waveguide is coupled to an endwall of the multimode interference waveguide, (ii) the at least one first coupling waveguide is coupled to a sidewall of the multimode interference waveguide, or (iii) the at least one first coupling waveguide is coupled to a junction of a sidewall and an endwall of the multimode interference waveguide.

8. The demultiplexer/multiplexer of claim 1, wherein the at least one first coupling waveguide is configured to couple a signal between the at least one first coupling waveguide and the multimode interference waveguide which has a broadened spatial profile, optionally having a substantially flat-top spectral profile, optionally the at least one first coupling waveguide has a stepped or tapered waveguide, whereby the at least one first coupling waveguide couples an optical signal between the at least one first coupling waveguide and the multimode interference waveguide which has a broadened spatial profile, optionally having a substantially flat-top spectral profile.

9. The demultiplexer/multiplexer of claim 1, comprising:
a plurality of first coupling waveguides at a plurality of first locations which are spaced in the direction of transmission for the first angled multimode interferometer; and a first photonic structure which provides a plurality of output signals which have substantially equal intensity and a phase and/or polarization difference, optionally the first photonic structure comprises an imbalanced Mach-Zehnder Interferometer (MZI) having outputs which are coupled to respective ones of the first coupling waveguides.

10. The demultiplexer/multiplexer of claim 1, wherein (i) the at least one third coupling waveguide is coupled to an endwall of the multimode interference waveguide, (ii) the at least one third coupling waveguide is coupled to a sidewall of the multimode interference waveguide, or (iii) the at least one third coupling waveguide is coupled to a junction of a sidewall and an endwall of the multimode interference waveguide.

11. The demultiplexer/multiplexer of claim 1, wherein the at least one third coupling waveguide is configured to couple a signal between the at least one third coupling waveguide and the multimode interference waveguide which has a broadened spatial profile, optionally having a substantially flat-top spectral profile, optionally the at least one third coupling waveguide has a stepped or tapered waveguide, whereby the at least one third coupling waveguide couples an optical signal between the at least one third coupling waveguide and the multimode interference waveguide which has a broadened spatial profile, optionally having a substantially flat-top spectral profile.

12. The demultiplexer/multiplexer of claim 1, comprising:
a plurality of third coupling waveguides at a plurality of third locations which are spaced in the direction of transmission for the second angled multimode interferometer; and
a second photonic structure which provides a plurality of output signals which have substantially equal intensity and a phase and/or polarization difference, optionally the second photonic structure comprises an imbalanced Mach-Zehnder Interferometer (MZI) having outputs which are coupled to respective ones of the third coupling waveguides.

13. The demultiplexer/multiplexer of claim 1, wherein (i) the first and second angled multimode interferometers are each configured to operate as a demultiplexer, (ii) the first and second angled multimode interferometers are each configured to operate as a multiplexer, or (iii) one of the first and second angled multimode interferometers is configured to operate as a demultiplexer and the other of the first and second angled multimode interferometers is configured to operate as a multiplexer.

14. The demultiplexer/multiplexer of claim 1, wherein (i) at least one of or each of the first and second angled multimode interferometers are configured to provide for wavelength division (de)multiplexing, (ii) at least one of or each of the first and second angled multimode interferometers are configured to provide for polarization (de)multiplexing, or (iii) at least one of or each of the first and second angled multimode interferometers are configured to provide for wavelength division and polarization (de)multiplexing.

15. The demultiplexer/multiplexer of claim 1, wherein the demultiplexer/multiplexer is a semiconductor structure, optionally implemented in a semiconductor-on-insulator (SOI) structure.

16. An optical demultiplexer/multiplexer, comprising:
a multimode interference waveguide;
a plurality of first coupling waveguides which meet the multimode interference waveguide at a plurality of first locations and a plurality of second coupling waveguides which meet the multimode interference waveguide at a plurality of second locations which are spaced in a direction of transmission in relation to the first locations, with the first and second coupling waveguides together with the multimode interference waveguide providing an angled multimode interferometer which operates to demultiplex an optical signal having optical channels of a plurality of wavelengths and/or polarizations or multiplex optical signals of a plurality of wavelengths and/or wavelengths into an optical signal having optical channels of the plurality of wavelengths and/or polarizations;

wherein the first coupling waveguides are configured to receive optical signals having different wavelength and/or polarization components, each comprising optical channels having a plurality of wavelengths and/or polarizations, and provide for a broadened spatial profile, optionally having a substantially flat-top spectral profile, to signals transmitted between the first and second coupling waveguides;

optionally the first coupling waveguides are coupled to a photonic structure which provides a plurality of output signals which have substantially equal intensity and a phase and/or polarization difference, optionally the photonic structure comprises an imbalanced Mach-Zehnder Interferometer (MZI) having outputs which are coupled to respective ones of the third coupling waveguides.

17. An optical demultiplexer/multiplexer, comprising:

a multimode interference waveguide, wherein the multimode interference waveguide includes a first reflector at one end in a first direction of transmission which acts to reflect an optical signal or signals in a second direction of transmission which is opposite to the first direction of transmission; and at least one first coupling waveguide which meets the multimode interference waveguide at least one first location and a plurality of second coupling waveguides which meet the multimode interference waveguide at a plurality of second locations, with the at least one first coupling waveguide and the plurality of second coupling waveguides together with the multimode interference waveguide providing a first angled multimode interferometer which operates to demultiplex a first optical signal having optical channels of a plurality of wavelengths and/or polarizations or multiplex optical signals of a plurality of wavelengths and/or polarizations into a first optical signal having optical channels of the plurality of wavelengths and/or polarizations.

18. The demultiplexer/multiplexer of claim 17, wherein the first reflector comprises a reflective film or layer.

19. The demultiplexer/multiplexer of claim 17, wherein (i) the first and second coupling waveguides are coupled to opposite sides of the multimode interference waveguide, or (ii) the first and second coupling waveguides are coupled to a single, common side of the multimode interference waveguide.

20. The demultiplexer/multiplexer of claim 17, wherein (i) the first angled multimode interferometer is configured to operate as a demultiplexer, or (ii) the first angled multimode interferometer is configured to operate as a multiplexer.

21. The demultiplexer/multiplexer of claim 17, further comprising:

at least one third coupling waveguide which meets the multimode interference waveguide at least one third location and a plurality of fourth coupling waveguides which meet the multimode interference waveguide at a plurality of fourth locations, with the at least one third coupling waveguide and the plurality of fourth coupling waveguides together with the multimode interference waveguide providing a second angled multimode interferometer which operates to demultiplex a second optical signal having optical channels of a plurality of wavelengths and/or polarizations or multiplex optical signals of a plurality of wavelengths and/or polarizations into a second optical signal having optical channels of the plurality of wavelengths and/or polarizations;

optionally (i) the third and fourth coupling waveguides are coupled to opposite sides of the multimode interference waveguide, or (ii) the third and fourth coupling waveguides are coupled to a single, common side of the multimode interference waveguide.

22. The demultiplexer/multiplexer of claim 17, wherein (i) the second angled multimode interferometer is configured to operate as a demultiplexer, or (ii) the second angled multimode interferometer is configured to operate as a multiplexer.

23. The demultiplexer/multiplexer of claim 17, wherein (i) the first and third coupling waveguides are coupled to a single, common side of the multimode interference waveguide, or (ii) the first and third coupling waveguides are coupled to opposite sides of the multimode interference waveguide.

24. The demultiplexer/multiplexer of claim 17, wherein (i) the second and fourth coupling waveguides are coupled to a single, common side of the multimode interference waveguide, or (ii) the second and fourth coupling waveguides are coupled to opposite sides of the multimode interference waveguide.

25. The demultiplexer/multiplexer of claim 17, wherein (i) the first and second angled multimode interferometers have a single, common input transmission direction, or (ii) the multimode interference waveguide includes a second reflector at an opposite, other end to the first reflector, which acts to reflect an optical signal or signals in the first direction of transmission, and the input transmission direction of the first angled multimode interferometer is opposite to the input transmission direction of the second angled multimode interferometer, optionally the second reflector comprises a reflective film or layer.

26. The demultiplexer/multiplexer of claim 17, wherein the demultiplexer/multiplexer is a semiconductor structure, optionally implemented in a semiconductor-on-insulator (SOI) structure.

27. An optical transceiver incorporating the at least one demultiplexer/multiplexer of claim 1.

28. An optical sensor incorporating the at least one demultiplexer/multiplexer of claim 1.

29. A method of using the demultiplexer/multiplexer of claim 1, optionally (a) the first and second angled multimode interferometers each operate as demultiplexers, (b) the first and second angled multimode interferometers each operate as multiplexers, or (c) one of the first and second angled multimode interferometers operates as a demultiplexer and the other of the first and second angled multimode interferometers operates as a multiplexer.

* * * * *